(12) United States Patent
Eckhardt et al.

(10) Patent No.: US 12,320,645 B2
(45) Date of Patent: Jun. 3, 2025

(54) VEHICLE POSITION VERIFICATION

(71) Applicant: THE BOEING COMPANY, Chicago, IL (US)

(72) Inventors: Josh Daniel Eckhardt, St. Peters, MO (US); Seyed Mehran Dibaji, Quincy, MA (US)

(73) Assignee: THE BOEING COMPANY, Arlington, VA (US)

( * ) Notice: Subject to any disclaimer, the term of this patent is extended or adjusted under 35 U.S.C. 154(b) by 97 days.

(21) Appl. No.: 17/577,856

(22) Filed: Jan. 18, 2022

(65) Prior Publication Data
US 2022/0373333 A1    Nov. 24, 2022

Related U.S. Application Data

(60) Provisional application No. 63/190,316, filed on May 19, 2021.

(51) Int. Cl.
| | | |
|---|---|---|
| *G01C 21/00* | (2006.01) | |
| *G01C 21/20* | (2006.01) | |
| *G01S 19/21* | (2010.01) | |

(52) U.S. Cl.
CPC .......... *G01C 21/005* (2013.01); *G01C 21/20* (2013.01); *G01S 19/215* (2013.01)

(58) Field of Classification Search
None
See application file for complete search history.

(56) References Cited

U.S. PATENT DOCUMENTS

| | | | |
|---|---|---|---|
| 8,600,671 B2 | 12/2013 | Wang | |
| 9,513,129 B2 | 12/2016 | Wang | |
| 10,408,942 B2 | 9/2019 | Kim et al. | |
| 10,705,221 B2 | 7/2020 | Raab et al. | |
| 11,585,942 B2 * | 2/2023 | Wang | H04K 3/22 |
| 2015/0226858 A1 | 8/2015 | Leibner et al. | |
| 2017/0357009 A1 | 12/2017 | Raab et al. | |

(Continued)

FOREIGN PATENT DOCUMENTS

| | | | | |
|---|---|---|---|---|
| DE | 102017209594 A1 | 12/2018 | | |
| EP | 3495848 B1 * | 11/2020 | ........... | G01S 19/215 |

OTHER PUBLICATIONS

Wikipedia, "Differential GPS," retrieved Jan. 22, 2021, 4 pgs.

(Continued)

*Primary Examiner* — Vivek D Koppikar
*Assistant Examiner* — David Ruben Pedersen
(74) *Attorney, Agent, or Firm* — Moore IP Law

(57) ABSTRACT

A device includes a memory configured to store a first position estimate of a first vehicle. The device also includes a receiver configured to receive a second position estimate of a second vehicle. The device further includes a sensor configured to generate sensor data indicating a first relative position estimate of the first vehicle relative to the second vehicle. The device also includes one or more processors configured to determine, based on a comparison of the first position estimate and the second position estimate, a second relative position estimate of the first vehicle relative to the second vehicle. The one or more processors are also configured to determine whether the first position estimate is reliable based at least in part on determining whether the first relative position estimate matches the second relative position estimate.

20 Claims, 9 Drawing Sheets

(56) References Cited

U.S. PATENT DOCUMENTS

| | | | | |
|---|---|---|---|---|
| 2018/0196140 | A1* | 7/2018 | Garcia | G01S 5/06 |
| 2019/0317221 | A1* | 10/2019 | Molina-Markham | |
| | | | | G01S 19/215 |
| 2020/0363211 | A1* | 11/2020 | Furuichi | G01C 21/30 |
| 2021/0116579 | A1* | 4/2021 | Rezaei | G01S 19/25 |
| 2022/0244400 | A1* | 8/2022 | Becheret | G01S 19/215 |
| 2022/0350030 | A1* | 11/2022 | Shuman | G01S 19/215 |
| 2022/0373333 | A1 | 11/2022 | Eckhardt et al. | |

OTHER PUBLICATIONS

Broussard, Martin et al., "AI-IMU Dead Reckoning," IEEE Transactions on Intelligent Vehicles, vol. 4, No. 4, Dec. 2020, pp. 585-595.

Extended European Search Report for application No. 23151595.8 dated Jun. 29, 2023, pp. 1-6.

Fan, Enguang et al., "Towards Effective Swarm-Based GPS Spoofing Detection in Disadvantaged Platforms," Milcom 2023—2023 IEEE Military Communications Conference (Milcom), Boston, MA, USA, 2023, pp. 722-728, doi: 10.1109/MILCOM58377.2023. 10356314.

Jafarnia-Jahromi, Ali et al., GPS Vulnerability to Spoofing Threats and a Review of Antispoofing Techniques, Review Article, International Journal of Navigation and Observaction, Hindawi Publishing Corporation, vol. 2012, Article ID 127072, pp. 1-6, doi: 10.1155/2012/127072.

Jansen, Kai et al., "Multi-Receiver GPS Spoofing Detection: Error Models and Realization," ACSAC' 16, Dec. 5-9, 2026, pp. 1-14, doi: 10.1145/2991079.2991092.

Kerns, Andrew J. et al., "Unmanned Aircraft Capture and Control via GPS Spoofing," https://www.google.com/url?sa=t&source=web&rct=j&opi=89978449&url=https://ml.ae.utexas.edu/images/stories/files/papers/unmannedCapture.pdf&ved=2ahUKEwjlqaGzhv6EAxVxBEQIHTJ9BZQQFnoECCAQAQ&usg=AOvVaw2OIT4e0dBayQYKRS72aFL4, 2014, pp. 1-29, doi: 10.1002/rob.21513.

Skog, Isaac et al., "In-Car Positioning and Navigation Technologies—A Survey," IEEE Transactions on Intelligent Transportation Systems, vol. 10, No. 1, Mar. 2009, pp. 4-21, doi: 10.1109/TITS.2008.2011712.

Sola, Joan, "Quaternion Kinematics for the error-state Kalman filter," Nov. 8, 2017, pp. 1-95, arXiv: 1711.02508v1 [cs.RO].

Zhou, Hang et al., "IMU Dead-Reckoning Localization with RNN-IEKF Algorithm," RSJ International Conference on Intelligent Robots and Systems (IROS), IEEE, Oct. 23-27, 20222, Kyoto, Japan, pp. 11383-11387, DOI: 10.1109/IROS47612.2022.9982087.

Altawy, Riham, et al., "Security, Privacy, and Safety Aspects of Civilian Drones: A Survey," ACM Transactions on Cyber-Physical Systems, vol. 1, No. 2, Article 7, Nov. 2016, pp. 7.1-7.25.

Bhatti, Jahshan et al., "Hostile Control of Ships via False GPS Signals: Demonstration and Detection," Department of Aerospace Engineering, The University of Texas at Austin, Preprint Article in Navigation, the journal of the Institute of Navigation, 2017, pp. 1-25.

Chen, Thomas M., Stuxnet, the Real Start of Cyber Warfare? IEEE Network, the Magazine of Global Internetworking, IEEE Network, Nov./Dec. 2010, pp. 2-3.

De La Torre, Conzalo et al., Driverless vehicle security: Challenges and future research opportunities, Future Generation Computer Systems, vol. 108, 2020, pp. 1092-1111.

Dibaji, Seyed Mehran et al., "Resilient consensus of second-order agent networks: Asynchronous update rules with delays," Automatica vol. 81, 2017, pp. 123-132.

Dibaji, Seyed Mehran et al., "Resilient Randomized Quantized Consensus," IEEE Transactions of Automatic Control, vol. 63, No. 8, Aug. 2018, pp. 2508-2522.

Falliere, Nicolas et al., "W32. Stuxnet Dossier," Version 1.3, Nov. 2020, Symantec Security Response, pp. 1-64.

Hartman, Kim et al., "The Vulnerability of UAVs to Cyber Attacks—An Approach to the Risk Assessment," 2013 5th International Conference on Cyber Conflict, 2013, pp. 1-23.

He, Daojing et al., Drone-Assisted Public Safety Networks: The Security Aspect, IEEE Communications Magazine, Aug. 2017, doi: 10.1109/MCOM.2017.1600799CM, pp. 218-224.

Jansen, Kai et al., "Multi-Receiver GPS Spoofing Detection: Error Models and Realization," ACSAC, Dec. 2016, DOI: http://dx.doi.org/10/1445/2991079.2991092, pp. 237-250.

Thing, Vrizlynn et al., Autonomous Vehicle Secuirty: A Taxonomy of Attacks and Defences, 2016 IEEE International Conference on Internet Things (IThings) and IEEE Green Computing and Communications (GreenCom) and IEEE Cyber, Physical and Social Computing (CPSCom and IEEE Smart Data (SmartData), 2016, pp. 165-170.

White, Nathan, et al., "Detection of Interference/Jamming and Spoofing in a DGPS-Aided Inertial System," IEEE Transactions on Aerospace and Electronic Systems, vol. 34, No. 4, Oct. 1998, pp. 1208-1217.

* cited by examiner

VEHICLE POSITION VERIFICATION

CROSS-REFERENCE TO RELATED APPLICATIONS

The present application claims the benefit of U.S. Provisional Patent Application No. 63/190,316 entitled "VEHICLE POSITION VERIFICATION," filed May 19, 2021, the contents of which are incorporated by reference in their entirety.

FIELD OF THE DISCLOSURE

The subject disclosure is generally related to verifying a position of a vehicle.

BACKGROUND

Vehicles, such as aircrafts, water vehicles, and ground vehicles, can employ navigational systems to determine position. As a non-limiting example, a particular vehicle can employ a Global Navigation Satellite System (GNSS) to determine the position of the particular vehicle. However, because the GNSS sends satellite-based signals to the particular vehicle that enable the particular vehicle to determine its position, the process can be subject to spoofing attacks. As a non-limiting example, a third party (e.g., a spoofer) can corrupt the integrity of one or more of the satellite-based signals used by particular vehicle in determining its position. To illustrate, the third party can create a fake signal that is in phase with an authentic satellite-based signal from the GNSS but that is also stronger than the authentic satellite-based signal. As a result, the particular vehicle can detect and use the fake signal in determining its position.

SUMMARY

In a particular implementation, a device includes a memory configured to store a first position estimate of a first vehicle. The device also includes a receiver configured to receive a second position estimate of a second vehicle. The device further includes a sensor configured to generate sensor data indicating a first relative position estimate of the first vehicle relative to the second vehicle. The device also includes one or more processors configured to determine, based on a comparison of the first position estimate and the second position estimate, a second relative position estimate of the first vehicle relative to the second vehicle. The one or more processors are also configured to determine whether the first position estimate is reliable based at least in part on determining whether the first relative position estimate matches the second relative position estimate.

In another particular implementation, a method includes determining, by a device, a first position estimate of a first vehicle. The method also includes receiving, by the device, a second position estimate of a second vehicle. The method further includes receiving, by the device, sensor data indicating a first relative position estimate of the first vehicle relative to the second vehicle. The method also includes determining, based on a comparison of the first position estimate and the second position estimate, a second relative position estimate of the first vehicle relative to the second vehicle. The method further includes, based at least in part on determining whether the first relative position estimate matches the second relative position estimate, determining whether the first position estimate is reliable.

In another particular implementation, a non-transitory computer-readable storage medium stores instructions that, when executed by one or more processors, cause the one or more processors to determine a first position estimate of a first vehicle. The instructions, when executed by the one or more processors, further cause the one or more processors to receive a second position estimate of a second vehicle and receive sensor data indicating a first relative position estimate of the first vehicle relative to the second vehicle. The instructions, when executed by the one or more processors, also cause the one or more processors to determine, based on a comparison of the first position estimate and the second position estimate, a second relative position estimate of the first vehicle relative to the second vehicle. The instructions, when executed by the one or more processors, further cause the one or more processors to, based at least in part on determining whether the first relative position estimate matches the second relative position estimate, determine whether the first position estimate is reliable.

The features, functions, and advantages described herein can be achieved independently in various implementations or can be combined in yet other implementations, further details of which can be found with reference to the following description and drawings.

DETAILED DESCRIPTION

Figure 1:
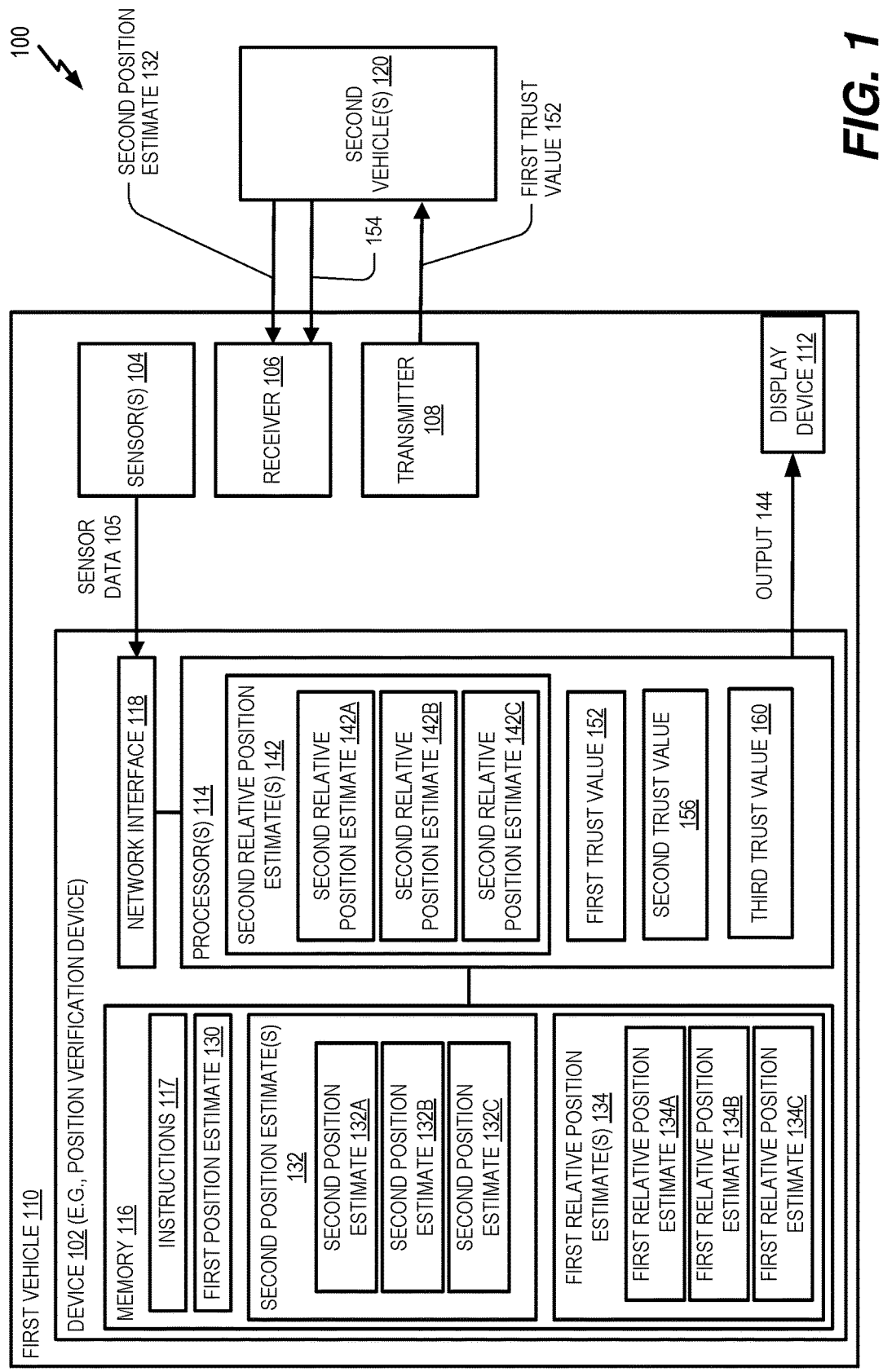
FIG. 1 is a diagram that illustrates an example system configured to verify a position of a vehicle.

Aspects disclosed herein present example systems and methods for verifying a position of a vehicle. A position verification device can determine a position of an aircraft based on detected signals associated with a navigational system. As a non-limiting example, the position verification device can determine the position of the aircraft using a trilateration process based on Global Positioning System (GPS) signals detected from a plurality of GPS satellites.

To verify the determined position and to ensure that the detected GPS signals were not spoofed, the position verification device can determine a first relative position (e.g., a sensor-based relative position) of the aircraft to a second aircraft. For example, the position verification device can use radio ranging or sensor techniques, such as radar or lidar, to determine a distance between the aircraft and the second aircraft and to determine an angular orientation of the aircraft with respect to the second aircraft. Additionally, the position verification device can determine a second relative position (e.g., a satellite-based relative position) of the aircraft to the second aircraft. To determine the second relative position, the position verification device can receive a second position of the second aircraft, from the second aircraft, using secure radio communications. The second position of the second aircraft can be determined, by the second aircraft, using GPS signals detected from the plurality of GPS satellites. Based on the received second position of the second aircraft and the determined position of the aircraft, the position verification device can determine a second relative position of the aircraft to the second aircraft. As a non-limiting example, the position verification device can use the latitude, longitude, and altitude components of each position to determine the second relative position.

If the second relative position (e.g., determined using satellite-based positions) matches the first relative position (e.g., determined using radio ranging or sensor techniques), the position verification device can verify the determined position of the aircraft (e.g., the determined position is reliable). However, if the second relative position fails to match the first relative position, the position verification device can determine that the GPS signals used to determine the position of the aircraft could be subject to third party spoofing and that the determined position of the aircraft is unreliable.

As described below, additional aircrafts (e.g., described additional "second" aircrafts) can also be used to further improve the verification process. In particular, the position verification device can compare satellite-based relative positions and sensor-based relative positions of a plurality of second aircrafts to determine whether a position determined based on satellite signals is reliable.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple first relative position estimates are illustrated and associated with reference numbers 134A, 134B, and 134C. When referring to a particular one of these first relative position estimates, such as the first relative position estimate 134A, the distinguishing letter "A" is used. However, when referring to any arbitrary one of these first relative position estimates or to these first relative position estimates as a group, the reference number 134 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 with one or more processors ("processor(s)" 114 in FIG. 1), which indicates that in some implementations the device 102 includes a single processor 114 and in other implementations the device 102 includes multiple processors 114. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of an example system 100 that is configured to verify a position of a vehicle. The example system 100 includes a first vehicle 110 and at least one second vehicle 120. According to one implementation, the vehicles 110, 120 correspond to aircrafts. In other implementations, the vehicles 110, 120 can correspond to water vehicles or ground vehicles. However, for ease of illustration, unless otherwise noted, the vehicles 110, 120 are described as aircrafts.

The example system 100 includes a device 102 (e.g., a position verification device). Although depicted onboard the first vehicle 110, the device 102 can be onboard or off-board the first vehicle 110. In a particular aspect, the example system 100 includes one or more sensors 104 onboard the first vehicle 110, a receiver 106 onboard the first vehicle 110, a transmitter 108 onboard the first vehicle 110, and a display device 112 onboard the first vehicle 110.

The device 102 includes one or more processors 114 coupled to a memory 116, a network interface 118, or both. The memory 116 includes a computer-readable medium (e.g., a computer-readable storage device) that stores instructions 117 that are executable by the processor 114. The instructions 117 are executable to initiate, perform, or control operations to aid in position verification of a vehicle (e.g., the first vehicle 110).

The memory 116 is configured to store a first position estimate 130 of the first vehicle 110. In particular, the memory 116 can store data indicating the first position estimate 130 of the first vehicle 110. In a particular aspect, the first position estimate 130 corresponds to a position (e.g., longitude, latitude, and altitude) of the first vehicle 110, as determined by one or more satellite-based signals obtained by the processor 114. To illustrate, the first position estimate 130 can be determined by the processor 114 based on satellite data or satellite signals from one or more navigational systems. As non-limiting examples, the first position estimate 130 can be based on global positioning system (GPS) data, dead reckoning data, global navigation satellite system (GNSS) data, a local positioning system (LPS) data, or a combination thereof. The processor 114 can use the data from the one or more navigational systems to perform a trilateration process to determine the first position estimate 130.

In some scenarios, the first position estimate 130, as determined by the processor 114, can be compromised based on third party activity. For example, a third party can spoof at least one of the satellite-based signals associated with the one or more navigational systems and used by the processor 114 to determine the first position estimate 130. As a result of the signal spoofing, the first position estimate 130 determined by the processor 114 can be unreliable. The techniques described below enable the device 102 to verify whether the first position estimate 130 of the first vehicle 110 is reliable.

To illustrate, the receiver 106 can be configured to receive a second position estimate 132 of the second vehicle 120. In a particular aspect, the second position estimate 132 is sent, from the second vehicle 120, to the first vehicle 110 using secure radio communications. The second position estimate 132 can be determined independently from the device 102 and stored in the memory 116. As a non-limiting example, the second vehicle 120 can determine the second position estimate 132 in a substantially similar manner as the processor 114 determines the first position estimate 130 of the first vehicle 110. In a particular aspect, the second position estimate 132 corresponds to a position (e.g., longitude, latitude, and altitude) of the second vehicle 120, as determined by one or more satellite-based signals obtained by the second vehicle 120. As described below, the second position estimate 132 of the second vehicle 120 can be used by the processor 114 to verify whether the first position estimate 130 of the first vehicle 110 is reliable.

In a particular aspect, the sensor 104 is configured to generate sensor data 105 indicating a first relative position estimate 134 of the first vehicle 110 relative to the second vehicle 120. The first relative position estimate 134 can indicate an estimated distance between the vehicles 110, 120 and an angular position of the second vehicle 120 with respect to the first vehicle 110. As described herein, the sensor data 105 can include lidar data, sonar data, radar data, time-of-flight data, or a combination thereof. The sensor data 105, and thus the indication of the first relative position estimate 134, can be stored in the memory 116.

Because the first relative position estimate 134 is based on sensed signal properties between the vehicles 110, 120, as opposed to satellite-based signals associated with navigational systems that are subject to spoofing, the first relative position estimate 134 of the first vehicle 110 relative to the second vehicle 120 can be presumed to be relatively reliable. However, the first relative position estimate 134 does not indicate the position of the first vehicle 110, but merely indicates the relative position of the first vehicle 110 with respect to the second vehicle 120. As described below, the first relative position estimate 134 can be compared with a relative position estimate that is derived, at least in part, from satellite-based signals associated with navigational systems (e.g., a relative position estimate derived from the first position estimate 130 and the second position estimate 132) to verify a position of the first vehicle 110.

For example, the processor 114 can be configured to determine a second relative position estimate 142 of the first vehicle 110 relative to the second vehicle 120 based on a comparison of the first position estimate 130 and the second position estimate 132. As described above, the first position estimate 130 can indicate the longitude, latitude, and altitude of the first vehicle 110 based on signals associated with navigational systems. In a similar manner, the second position estimate 132 can indicate the longitude, latitude, and altitude of the second vehicle 120 based on signals associated with navigational systems. By comparing or differentiating the first position estimate 130 to the second position estimate 132, the processor 114 can determine a distance between the vehicles 110, 120 and an angular position of the second vehicle 120 with respect to the first vehicle 110. The distance and the angular position correspond to the second relative position estimate 142 and are based on the satellite-based signals (associated with the navigational systems) subject to spoofing.

The processor 114 can be configured to determine whether the first position estimate 130 is reliable based at least in part on determining whether the first relative position estimate 134 matches the second relative position estimate 142. For example, if the first relative position estimate 134 matches the second relative position estimate 142, the processor 114 can determine that the first position estimate 130 is reliable and that the satellite-based signals used to determine the first position estimate 130 were not subject to third party spoofing. As used herein, position estimates "match" if the position estimates are within a threshold distance of each other. As non-limiting examples, position estimates can match if the position estimates are within one meter, two meters, five meters, ten meters, etc. It should be understood that different thresholds can be used to determine whether position estimates match. Additionally, the processor 114 can generate an output 144 indicating that the first position estimate 130 is reliable.

However, if the first relative position estimate 134 fails to match the second relative position estimate 142, the processor 114 can determine that the first position estimate 130 is unreliable and that the satellite-based signals used to determine the first position estimate 130 (or satellite-based signals used to determine the second position estimate 132) could be subject to third party spoofing. Additionally, the processor 114 can generate an output 144 indicating that the first position estimate 130 is unreliable.

Additional measures can also be implemented to further verify the reliability of the first position estimate 130. For example, the processor 114 can compare a relative position estimate of the first vehicle 110 relative to a plurality of second vehicles 120A-120C to determine whether the first position estimate 130 is subject to spoofing.

Figure 2:
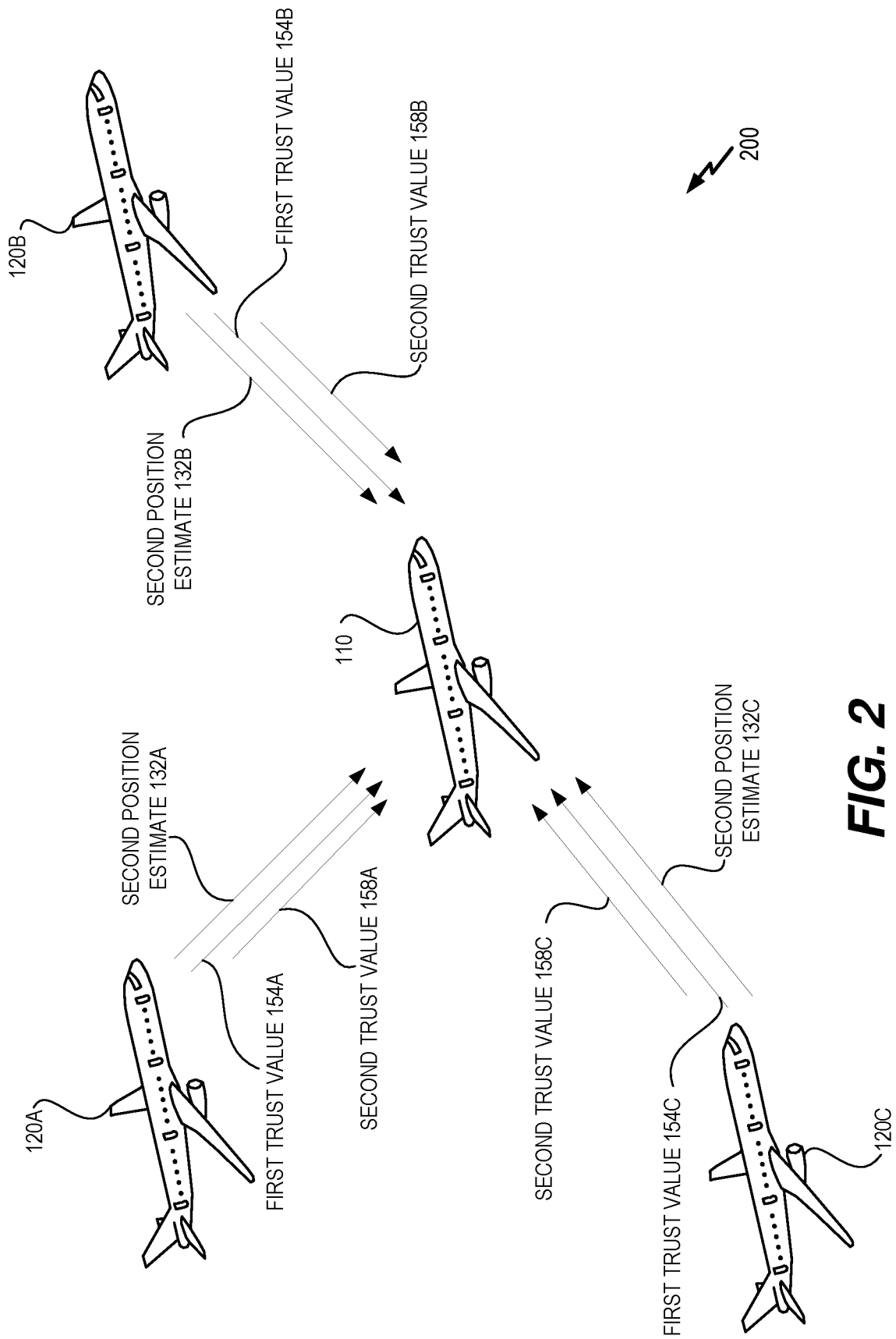
FIG. 2 is a diagram of a particular example of a plurality of second vehicles sending position information to a first vehicle.

Referring briefly to FIG. 2, a particular example 200 of position information received from a plurality of second vehicles 120 is shown. According to the example 200, a second vehicle 120A transmits a second position estimate 132A to the first vehicle 110, a second vehicle 120B transmits a second position estimate 132B to the first vehicle 110, and a second vehicle 120C transmits a second position estimate 132C to the first vehicle 110. Although three vehicles 120A-120C are illustrated in FIG. 2 as transmitting second position estimates 132A-132C to the first vehicle 110, in other implementations, additional vehicles can transmit position estimates to the first vehicle 110 according to the techniques described herein. As a non-limiting example, twenty vehicles can transmit position estimates to the first vehicle 110 according to the techniques described herein. In other implementations, fewer vehicles can transmit position estimates to the first vehicle 110 according to the techniques described herein. As a non-limiting example, two vehicles can transmit position estimates to the first vehicle 110 according to the techniques described herein.

Referring back to FIG. 1, the receiver 106 can be configured to receive the second position estimate 132A of the second vehicle 120A, the second position estimate 132B of the second vehicle 120B, and the second position estimate 132C of the second vehicle 120C. The second position estimates 132A-132C can be determined independently from the device 102 and stored in the memory 116. As a non-limiting example, the second vehicles 120A-120C can determine the respective second position estimates 132A-132C in a substantially similar manner as the processor 114 determines the first position estimate 130 of the first vehicle 110. In a particular aspect, the second position estimates 132A-132C correspond to the respective positions (e.g., longitude, latitude, and altitude) of the second vehicles 120A-120C, as determined by one or more satellite-based signals obtained by the second vehicles 120A-120C.

In a particular aspect, the sensor 104 is configured to generate sensor data 105 indicating a first relative position estimate 134A of the first vehicle 110 relative to the second vehicle 120A, a first relative position estimate 134B of the first vehicle 110 relative to the second vehicle 120B, and a first relative position estimate 134C of the first vehicle 110 relative to the second vehicle 120C. The first relative position estimates 134A-134C can indicate an estimated distance between the first vehicle 110 and the respective second vehicle 120A-120C and an angular position of the respective second vehicle 120A-120C with respect to the first vehicle 110.

Because the first relative position estimates 134A-134C are based on sensed signal properties (e.g., radar signals, lidar signals, etc.), as opposed to signals associated with navigational systems that are subject to spoofing, the first relative position estimates 134A-134C can be presumed to be relatively reliable. However, the first relative position estimates 134A-134C do not indicate the position of the first vehicle 110, but merely indicate the relative position of the first vehicle 110 with respect to the second vehicles 120A-120C. As described below, the first relative position estimates 134A-134C can be compared with corresponding relative position estimates that are derived, at least in part, from signals associated with navigational systems (e.g., relative position estimates derived from the first position estimate 130) to verify a position of the first vehicle 110.

For example, the processor 114 can be configured to determine a second relative position estimate 142A of the first vehicle 110 relative to the second vehicle 120A based on a comparison of the first position estimate 130 and the second position estimate 132A. In a similar manner, the processor 114 can determine second relative position estimates 142B, 142C of the first vehicle 110 relative to the second vehicles 120B, 120C based on a comparison of the first position estimate 130 and the second position estimates 132B, 132C, respectively. By comparing the first position estimate 130 to the corresponding second position estimates 132A-132C, the processor 114 can determine distances between the first vehicle 110 and the respective second vehicles 120A-120C. By comparing the first position estimate 130 to the corresponding second position estimates 132A-132C, the processor 114 can also determine angular positions of the corresponding second vehicles 120A-120C with respect to the first vehicle 110. The distances and the angular positions correspond to the second relative position estimates 142A-142C.

In a particular aspect, the processor 114 is configured to determine that the first position estimate 130 is unreliable in response to determining that at least a threshold percentage of the plurality of first relative position estimates 134A-134C do not match corresponding ones of the plurality of second relative position estimates 142A-142C. According to one implementation, the threshold percentage is equal to 100 percent. In this implementation, if any of the first relative position estimates 134A-134C fail to match the corresponding second relative position estimates 142A-142C, the processor 114 can determine that the first position estimate 130 is unreliable and that the signals associated with navigational systems used to determine the first position estimate 130 (or signals associated with navigational systems used to determine at least one of the second position estimates 132A-132C) could be subject to third party spoofing. Additionally, the processor 114 can generate an output 144 indicating that the first position estimate 130 is unreliable.

According to another implementation, the threshold percentage is equal to 50 percent. In this implementation, if two of the first relative position estimates 134A-134C fail to match the corresponding second relative position estimates 142A-142C, the processor 114 can determine that the first position estimate 130 is unreliable and that the signals associated with navigational systems used to determine the first position estimate 130 (or signals associated with navigational systems used to determine at least one of the second position estimates 132A-132C) could be subject to third party spoofing. Additionally, the processor 114 can generate an output 144 indicating that the first position estimate 130 is unreliable. As a non-limiting example, the output 144 can include a visual display notifying a pilot that one or more navigational signals could be unreliable or compromised. Additionally, the output 144 can be used to prohibit the use or the unreliable GPS data for further processing by an on-board navigational system. In some implementations, the output 144 can trigger use of other location detection techniques for navigational purposes.

It should be understood that other threshold percentages can be used to determine whether the first position estimate 130 is unreliable. The 100 percent threshold and the 50 percent threshold are merely non-limiting examples. It should be understood that higher threshold percentages result in more accurate reliability determinations. That is, if the threshold percentage is equal to 75 percent, the determination that the first position estimate 130 is reliable will be more accurate than if the threshold percentage is equal to 25 percent. For example, if the threshold percentage is higher, fewer first position estimates of the first vehicle 110 are likely to be falsely identified as reliable when they are actually based on spoofed GPS signals. However, a higher threshold percentage could increase first position estimates of the first vehicle 110 that are falsely identified as unreliable even though they are actually based on non-spoofed GPS signals. For example, with a 100 percent threshold, the first position estimate 130 would be identified as unreliable even when the first position estimate 130 is based on non-spoofed GPS signals if any of the second position estimates 132A-C is incorrect or based on spoofed GPS signals. The threshold percentage can be selected to balance a likelihood of false reliability determinations with a likelihood of false unreliability determinations. For example, the 100 percent threshold can be used in conditions where false reliability determinations cannot be tolerated (e.g., flying in low visibility). In a particular aspect, the processor 114 can dynamically adjust the threshold percentage based on detected conditions.

According to some implementations, the processor 114 can be configured to determine a first trust value 152 of the first vehicle 110 based on a percentage of the plurality of first relative position estimates 134A-134C that do not match corresponding ones of the plurality of second relative position estimates 142A-142C. The processor can determine whether the first position estimate 130 is reliable based at least in part on the first trust value 152. For example, in response to determining that the first trust value indicates that all of the plurality of first relative position estimates 134A-134C match the corresponding ones of the plurality of second relative position estimates 142A-142C, the processor 114 can be configured to determine that the first position estimate 130 is reliable. Conversely, in response to determining that the first trust value 152 indicates that none of the plurality of first relative position estimates 134A-134C match the corresponding ones of the plurality of second relative position estimates 142A-142C, the processor 114 can be configured to determine that the first position estimate 130 is unreliable. In a particular aspect, the transmitter 108 is configured to transmit the first trust value 152 of the first vehicle 110 to one or more of the plurality of second vehicles 120.

Referring briefly to FIG. 2, the plurality of second vehicles 120A-120C can send a plurality of first trust values 154A-154C to the first vehicle 110. The plurality of trust values 154A-154C of the plurality of second vehicles 120A-120C can be determined independently from the first vehicle 110 and can indicate percentages of navigational system based relative position estimates at the plurality of second vehicles 120A-C that do not match corresponding sensor based relative position estimates.

Referring back to FIG. 1, the receiver 106 can be configured to receive the plurality of first trust values 154A-154C of the plurality of second vehicles 120A-120C. In a particular aspect, the processor 114 is configured to determine whether the first position estimate 130 is reliable based on the plurality of first trust values 154A-154C of the plurality of second vehicles 120A-120C. For example, the processor 114 can determine a second trust value 156 of the first vehicle 110 based on the plurality of first trust values 154A-154C, the plurality of first relative position estimates 134A-134C, and the plurality of second relative position estimates 142A-142C. If the plurality of first trust values 154A-154C indicate that all of the navigational system based relative position estimates at the plurality of second vehicles 120A-120C match corresponding sensor based relative position estimates and if all of the plurality of first relative position estimates 134A-134C match the corresponding ones of the plurality of second relative position estimates 142A-142C, the processor 114 can be configured to determine that the first position estimate 130 is reliable.

Referring briefly to FIG. 2, the plurality of second vehicles 120A-120C can send a plurality of second trust values 158A-158C to the first vehicle 110. The plurality of second trust values 158A-158C of the plurality of second vehicles 120A-120C can be determined independently from the first vehicle 110 and can indicate percentages of navigational system based relative position estimates at the plurality of second vehicles that do not match corresponding sensor based relative position estimates.

Referring back to FIG. 1, the receiver 106 can be configured to receive the plurality of second trust values 158A-158C of the plurality of second vehicles 120A-120C. In a particular aspect, the processor 114 is configured to determine whether the first position estimate 130 is reliable based on the plurality of second trust values 158A-158C of the plurality of second vehicles 120A-120C. For example, the processor 114 can determine a third trust value 160 of the first vehicle 110 based on the plurality of second trust values 158A-158C, the plurality of first relative position estimates 134A-134C, and the plurality of second relative position estimates 142A-142C. If the plurality second trust values 158A-158C indicate that all of the navigational system based relative position estimates at the plurality of second vehicles 120A-120C match corresponding sensor based relative position estimates and if all of the plurality of first relative position estimates 134A-134C match the corresponding ones of the plurality of second relative position estimates 142A-142C, the processor 114 can be configured to determine that the first position estimate 130 is reliable.

The techniques described with respect to FIGS. 1-2 enable the device 102 to detect navigational system spoofing by verifying whether the first position estimate 130 of the first vehicle 110 (e.g., the position estimate based on signals associated with navigational systems) is reliable. For example, the device 102 can generate reliable data (e.g., the first relative position estimate 134) by using sensor systems (e.g., radar, lidar, etc.) to determine the relative position of the first vehicle 110 with respect to the second vehicle 120. The device 102 can use the reliable data to determine whether the signals from the navigational systems can be used to achieve a similar relative position. If the relative positions are similar, the device 102 can verify that the first position estimate 130 of the first vehicle 110 is reliable and that the signals associated with navigational systems have not been spoofed. However, if the relative positions are not similar, the device 102 can generate an alert indicating potential signal spoofing.

Figure 3:
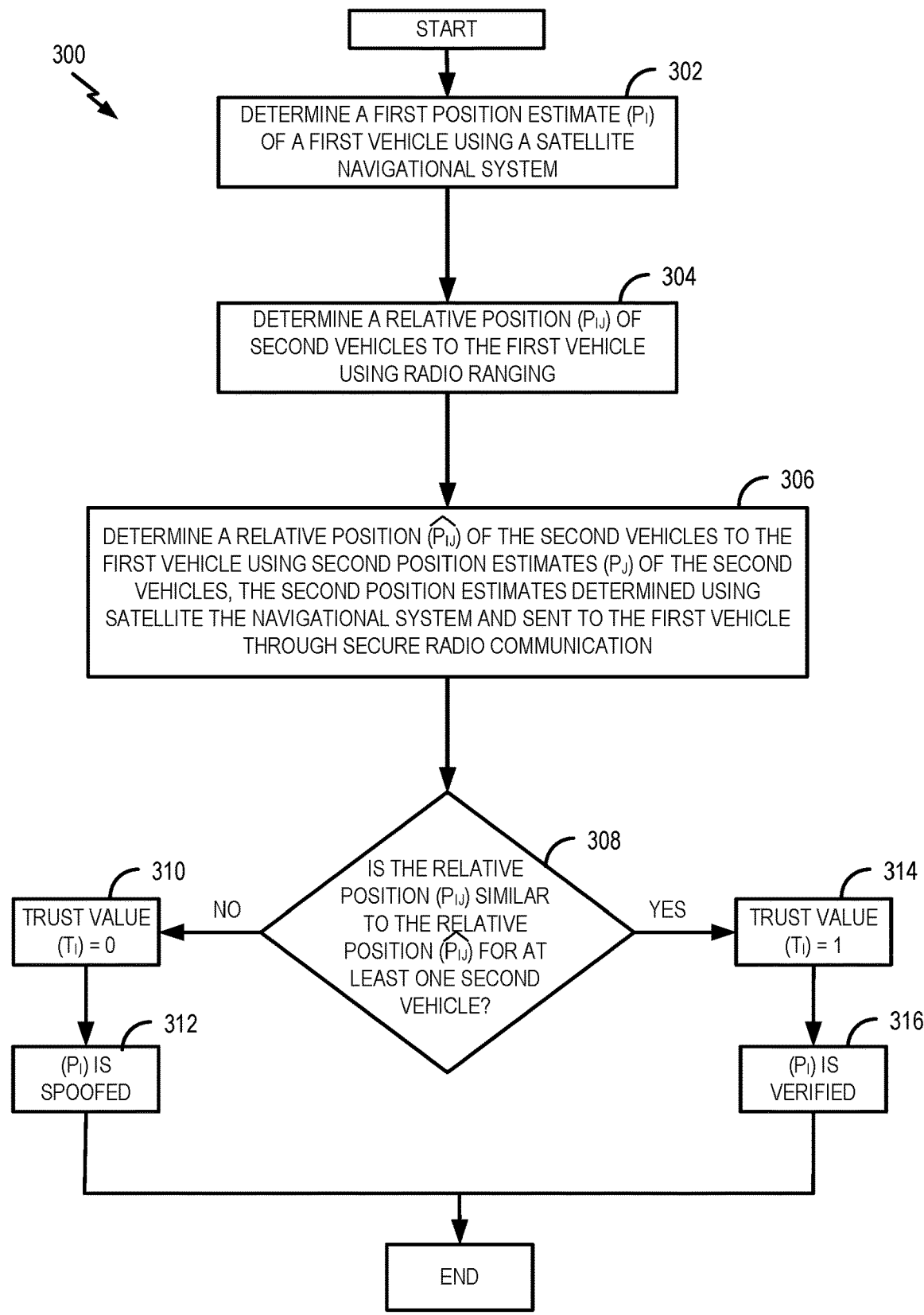
FIG. 3 is a diagram that illustrates a process for verifying a position of a vehicle.

Referring to FIG. 3, a diagram illustrates a process 300 for verifying a position of a vehicle. The operations associated with the process 300 can be performed by the first vehicle 110 of FIG. 1. In particular, the operations associated with process 300 can be performed by the device 102 of the first vehicle 110.

At block 302, the process 300 includes determining a first position estimate ($p_i$) of a first vehicle using a satellite navigational system. For example, referring to FIG. 1, the processor 114 can determine the first position estimate 130 based on data or signals from one or more navigational systems. As non-limiting examples, the first position estimate 130 can be based on GPS data, GNSS data, etc. At block 304, the process 300 includes determining a relative position ($p_{ij}$) of a plurality of second vehicles using radio ranging. For example, referring to FIG. 1, the sensor 104 can use radio ranging (e.g., radar, lidar, etc.) to determine the first relative position estimates 134A-134C of the first vehicle 110 with respect to the second vehicles 120A-120C.

At block 306, the process 300 includes determining a relative position ($\widehat{p_{ij}}$) of the plurality of second vehicles to the first vehicle using second position estimates ($p_j$) of the plurality of second vehicles. The second position estimates can be determined using the satellite navigational system and can be sent to the first vehicle through a secure radio communication. For example, referring to FIG. 2, the plurality of second vehicles 120A-120C can determine the respective second position estimates 132A-132C using a satellite navigational system and send the second position estimates 132A-132C to the first vehicle 110 via a secure communication. Based on the first position estimate 130 and the second position estimates 132A-132C, the processor 114 can determine the second relative position estimates 142A-142C of the plurality second vehicles 120A-120C with respect to the first vehicle 110.

At block 308, the process 300 includes determining whether the relative position ($p_{ij}$) of at least one of the second vehicles is similar to a corresponding relative position ($\widehat{p_{ij}}$). If there are no similar relative position estimates, the process 300 includes setting a trust value (e.g., the first trust value 152) to zero, at block 310, and determining that the first position estimate is not reliable (e.g., is spoofed), at block 312. However, if at least one relative position ($p_{ij}$) is similar to a corresponding relative position ($\widehat{p_{ij}}$), the process 300 includes setting the trust value (e.g., the first trust value 152) to one, at block 314, and determining that the first position estimate is reliable (e.g., is verified), at block 316.

The process 300 of FIG. 3 enables detection of navigational system spoofing by verifying whether the first position estimate 130 of the first vehicle 110 (e.g., the position estimate based on signals associated with navigational systems) is reliable. For example, the process 300 uses reliable data (e.g., the first relative position estimate 134) generated by radio ranging techniques (e.g., radar, lidar, etc.) to determine the relative position of the first vehicle 110 with respect to the second vehicle 120. The process 300 uses the reliable data to determine whether the signals from the navigational systems can be used to achieve a similar relative position. If the relative positions are similar, the device 102 can verify that the first position estimate 130 of the first vehicle 110 is reliable and that the signals associated with navigational systems have not been spoofed. However, if the relative positions are not similar, the device 102 can generate an alert indicating potential signal spoofing.

Figure 4:
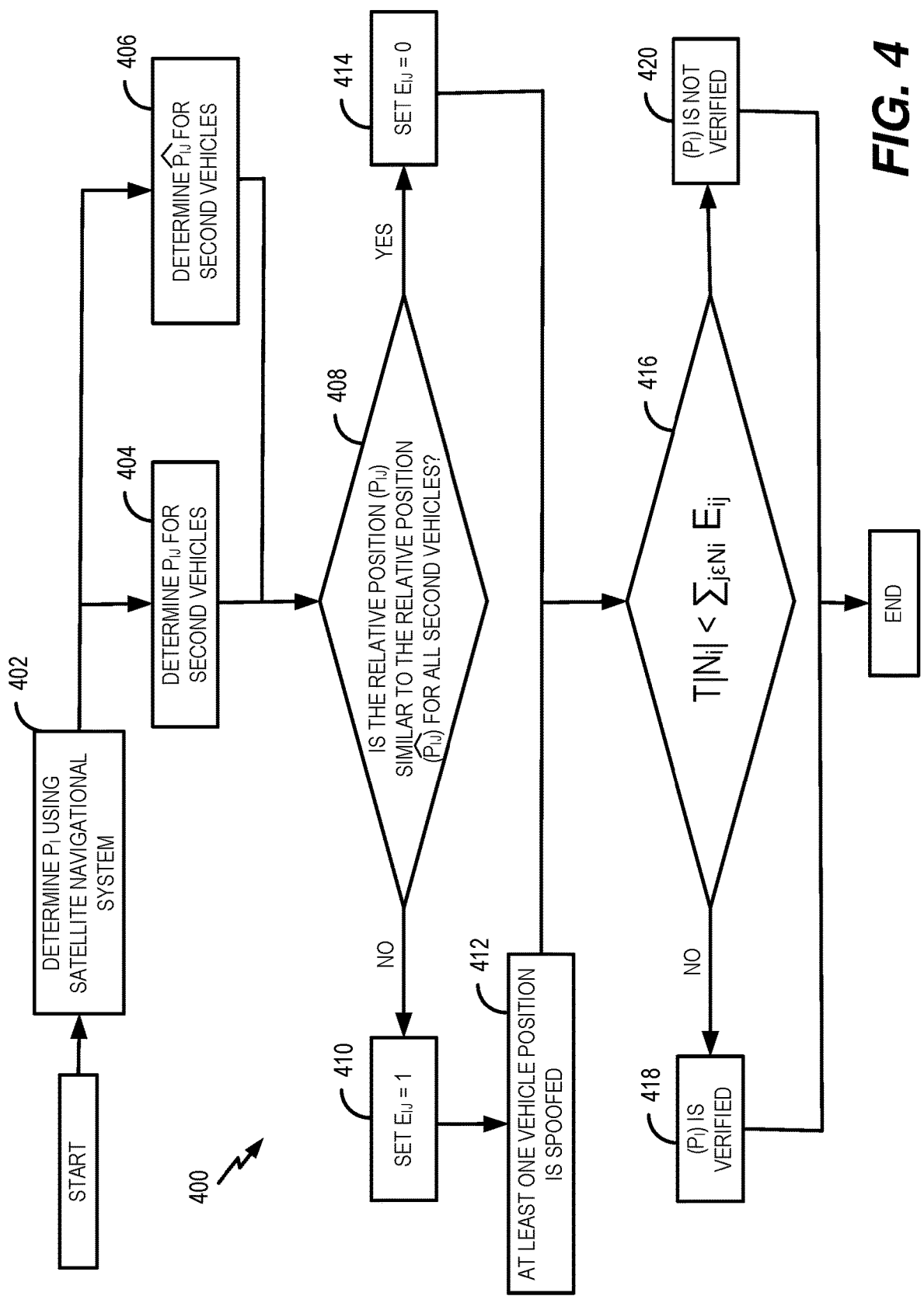
FIG. 4 is a diagram that illustrates another process for verifying a position of a vehicle.

Referring to FIG. 4, a diagram illustrates a process 400 for verifying a position of a vehicle. The operations associated with the process 400 can be performed by the first vehicle 110 of FIG. 1. In particular, the operations associated with process 400 can be performed by the device 102 of the first vehicle 110.

At block 402, the process 400 includes determining a first position estimate ($p_i$) of a first vehicle using a satellite navigational system. For example, referring to FIG. 1, the processor 114 can determine the first position estimate 130 based on data or signals from one or more navigational systems. As non-limiting examples, the first position estimate 130 can be based on GPS data, GNSS data, etc. At block 404, the process 400 includes determining a relative position ($p_{ij}$) of a plurality of second vehicles using radio ranging. For example, referring to FIG. 1, the sensor 104 can use radio ranging (e.g., radar, lidar, etc.) to determine the first relative position estimates 134A-134C of the first vehicle 110 with respect to the second vehicles 120A-120C.

At block 406, the process 400 includes determining a relative position ($\widehat{p_{ij}}$) of the plurality of second vehicles to the first vehicle using second position estimates ($p_j$) of the plurality of second vehicles. The second position estimates can be determined using the satellite navigational system and can be sent to the first vehicle through a secure radio communication. For example, referring to FIG. 2, the plurality of second vehicles 120A-120C can determine the respective second position estimates 132A-132C using the satellite navigational system and send the second position estimates 132A-132C to the first vehicle 110 via a secure communication. Based on the first position estimate 130 and the second position estimates 132A-132C, the processor 114 can determine the second relative position estimates 142A-142C of the plurality second vehicles 120A-120C with respect to the first vehicle 110.

At block 408, the process 400 includes determining whether the relative position ($p_{ij}$) of each of the second vehicles is similar to corresponding relative positions ($\widehat{p_{ij}}$). If each of the relative positions ($p_{ij}$) are similar to the corresponding relative positions ($\widehat{p_{ij}}$), a fault indicator ($E_{ij}$) for each corresponding second vehicle (j) is set to zero, at block 414, and the process 400 proceeds to block 418 to verify the first position estimate 130. For example, if each of the first relative position estimates 134A-134C is similar to the corresponding second relative position estimates 142A-142C, the first position estimate 130 is reliable. If any of the relative positions ($p_{ij}$) are not similar to the corresponding relative positions ($\widehat{p_{ij}}$), the fault indicator ($E_{ij}$) for the corresponding second vehicle (j) is set to one, at block 410, and a determination is made that at least one vehicle position is spoofed, at block 412. For example, the fault indicator ($E_{ij}$) having a value of one indicates that the first position estimate 130 of the first vehicle 110 (e.g., vehicle i), the second position estimate 132 of the second vehicle 120 (vehicle j), or both, are unreliable. If any of the first relative position estimates 134A-134C is not similar to the corresponding second relative position estimates 142A-142C, the processor 114 can determine that at least one of the first position estimate 130 or at least one of the second position estimates 132A-132C is subject to spoofing.

At block 416, the process 400 includes determining whether a threshold count (T |$N_i$|) is less than a sum of the fault indicators ($\Sigma_{j \in N_i} E_{ij}$), where $N_i$ corresponds to a set of vehicles (e.g., the second vehicles 120) that can determine (e.g., measure) a relative position with respect to the first vehicle 110. For example, the set of vehicles (e.g., the second vehicles 120) are within a sensor range, a communication range, or both, of the first vehicle 110. The threshold count is based on a product of a threshold percentage (T) and a count (|$N_i$|) of the second vehicles 120. If the threshold count (e.g., T |$N_i$|) is greater than or equal to the sum of fault indicators ($\Sigma_{j \in N_i} E_{ij}$), the process 400 includes determining that the first position estimate is reliable (e.g., is verified), at block 418. However, if the threshold count (e.g., T |N$_i$|) is less than the sum of fault indicators ($\Sigma_{j \in N_i} E_{ij}$), the process 400 includes determining that the first position estimate is not verified, at block 420.

In an alternative implementation, at block 416, the process 400 includes determining whether a threshold percentage (T) is less than the percentage of non-matches (($\Sigma_{j \in N_i} E_{ij}$)/|N$_i$|). The percentage of non-matches is based on the sum of the fault indicators ($\Sigma_{j \in N_i} E_{ij}$) divided by the count (|N$_i$|) of the second vehicles 120. If the threshold percentage (T) is greater than or equal to the percentage of non-matches (($\Sigma_{j \in N_i} E_{ij}$)/|N$_i$|), the process 400 includes determining that the first position estimate is reliable (e.g., is verified), at block 418. However, if the threshold percentage (T) is less than the percentage of non-matches (($\Sigma_{j \in N_i} E_{ij}$)/|N$_i$|), the process 400 includes determining that the first position estimate is not verified, at block 420.

The process 400 of FIG. 4 enables detection of navigational system spoofing by verifying whether the first position estimate 130 of the first vehicle 110 (e.g., the position estimate based on signals associated with navigational systems) is reliable. For example, the process 400 uses reliable data (e.g., the first relative position estimate 134) generated by radio ranging techniques (e.g., radar, lidar, etc.) to determine the relative position of the first vehicle 110 with respect to the second vehicle 120. The process 400 uses the reliable data to determine whether the signals from the navigational systems can be used to achieve a similar relative position. If the relative positions are similar, the device 102 can verify that the first position estimate 130 of the first vehicle 110 is reliable and that the signals associated with navigational systems have not been spoofed. However, if the relative positions are not similar, the device 102 can generate an alert indicating potential signal spoofing.

Figure 5:
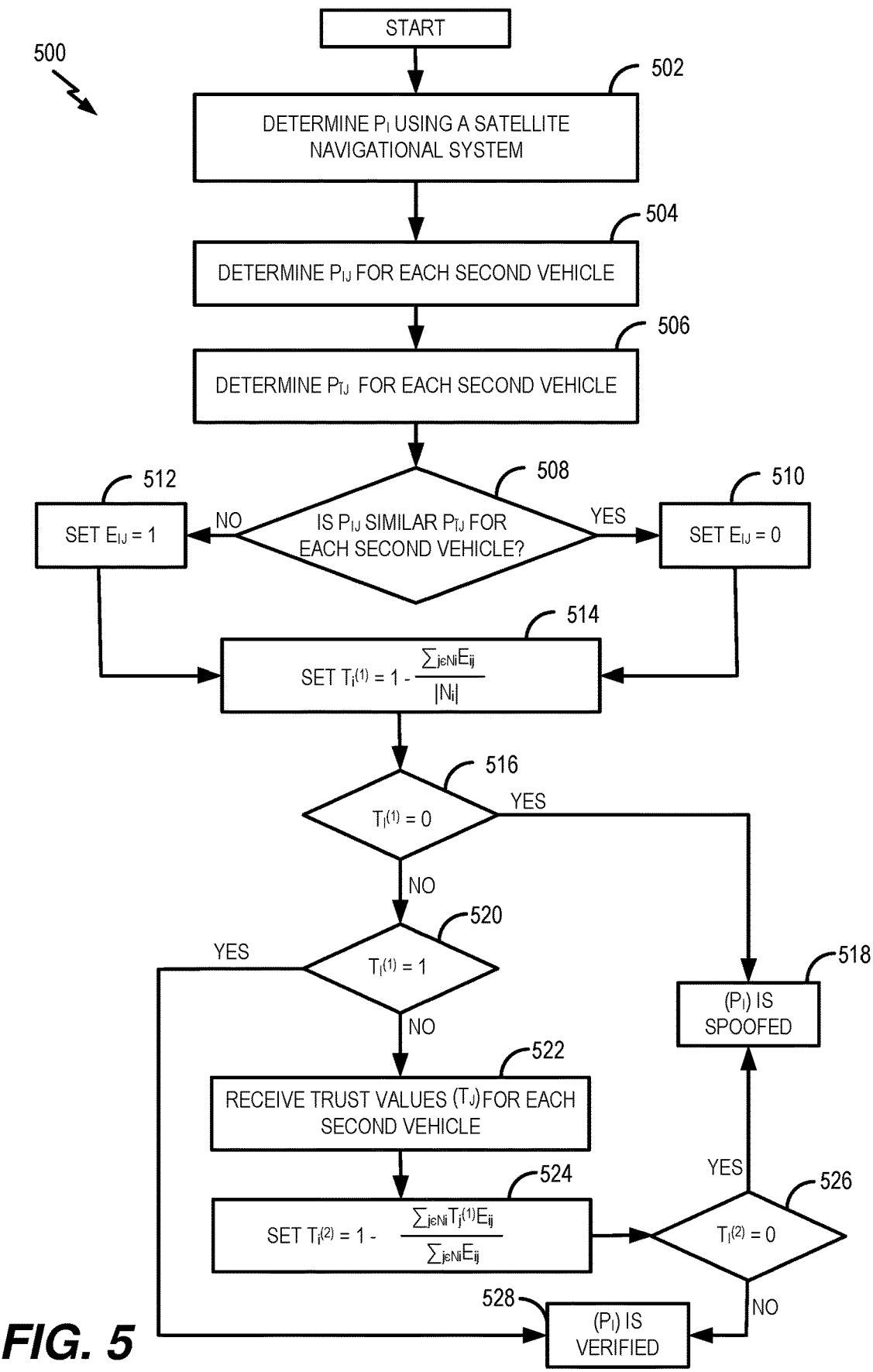
FIG. 5 is a diagram that illustrates another process for verifying a position of a vehicle.

Referring to FIG. 5, a diagram illustrates a process 500 for verifying a position of a vehicle. The operations associated with the process 500 can be performed by the first vehicle 110 of FIG. 1. In particular, the operations associated with process 500 can be performed by the device 102 of the first vehicle 110.

At block 502, the process 500 includes determining a first position estimate (p$_i$) of a first vehicle using a satellite navigational system. For example, referring to FIG. 1, the processor 114 can determine the first position estimate 130 based on data or signals from one or more navigational systems. At block 504, the process 500 includes determining a relative position (p$_{ij}$) of a plurality of second vehicles using radio ranging. For example, referring to FIG. 1, the sensor 104 can use radio ranging (e.g., radar, lidar, etc.) to determine the first relative position estimates 134A-134C of the first vehicle 110 with respect to the second vehicles 120A-120C. At block 506, the process 500 includes determining a relative position ($\widehat{p_{ij}}$) of the plurality of second vehicles to the first vehicle using second position estimates (p$_j$) of the plurality of second vehicles. The second position estimates can be determined using the satellite navigational system and can be sent to the first vehicle through a secure radio communication. For example, referring to FIG. 2, the plurality of second vehicles 120A-120C can determine the respective second position estimates 132A-132C using the satellite navigational system and send the second position estimates 132A-132C to the first vehicle 110 via a secure communication. Based on the first position estimate 130 and the second position estimates 132A-132C, the processor 114 can determine the second relative position estimates 142A-142C of the plurality second vehicles 120A-120C with respect to the first vehicle 110.

At block 508, the process 500 includes determining whether the relative position (p$_{ij}$) of each of the second vehicles is similar to corresponding relative positions ($\widehat{p_{ij}}$). If each of the relative positions (p$_{ij}$) are similar to the corresponding relative positions ($\widehat{p_{ij}}$), a fault indicator (E$_{ij}$) for each corresponding second vehicle (j) is set to zero, at block 510, and the process 500 proceeds to block 514. If any of the relative positions (p$_{ij}$) are not similar to the corresponding relative positions ($\widehat{p_{ij}}$), the fault indicator (E$_{ij}$) of the corresponding second vehicle (j) is set to one, at block 512, and the process 500 proceeds to block 514.

At block 514, the process sets a first trust value (T$_i^1$) (e.g., the first trust value 152) to $$T_i^1 = 1 - \frac{\sum_{j \in N_i} E_{ij}}{|N_i|},$$

where (($\Sigma_{j \in N_i} E_{ij}$)/|N$_i$|) corresponds to percentage of non-matches of the second vehicles 120A-120C (NO. At block 516, if the first trust value (T$_i^1$) is equal to zero, the process 500 can determine that the first position estimate 130 is subject to spoofing (e.g., the first position estimate 130) is not reliable, at block 518. However, if the first trust value (T$_i^1$) is not equal to zero, the process 500 determines whether the first trust value (T$_i^1$) is equal to one, at 520.

If the first trust value (T$_i^1$) is not equal to one, the process 500 initiates reception of trust values (T$_j$) for each second vehicle, at block 522, and sets a second trust value (T$_i^2$) (e.g., the second trust value 156) to $$T_i^2 = 1 - \frac{\sum_{j \in N_i} T_j^1 E_{ij}}{\sum_{j \in N} E_{ij}},$$

at block 524. For example, if the first trust value 154 (T$_j^1$) of a second vehicle 120 (vehicle j) has a value of 0 indicating that a second position estimate 132 of the second vehicle 120 is spoofed, the second position estimate 132 of the second vehicle 120 is ignored (e.g., does not negatively impact) the second trust value 156 (T$_i^2$) of the first vehicle 110 regardless of the value of the fault indicator (E$_{ij}$) for the second vehicle 120 (vehicle j). However, if the first trust value 154 (T$_j^1$) of a second vehicle 120 (vehicle j) has a value of 1 indicating that a second position estimate 132 of the second vehicle 120 is verified, the second trust value 156 (T$_i^2$) of the first vehicle 110 is based at least in part on the value of the fault indicator (E$_{ij}$) for the second vehicle 120 (vehicle j). For example, the second trust value 156 (T$_i^2$) of the first vehicle 110 is reduced when the fault indicator (E$_{ij}$) has a value of one indicating that the second vehicle 120 (vehicle j) is a non-match (e.g., there is a fault in at least one of the first position estimate 130 of the first vehicle 110 or the second position estimate 132 of the second vehicle 120).

If the second trust value 156 (T$_i^2$) is equal to zero, at block 526, the process 500 can determine that the first position estimate 130 is subject to spoofing (e.g., the first position estimate 130 is not reliable), at block 518. However, if the second trust value 156 (T$_i^2$) is not equal to zero, at block 526, the process 500 can determine that the first position estimate 130 is not subject to spoofing (e.g., the first position estimate 130 is reliable or verified), at block 528.

The process 500 of FIG. 5 enables detection of navigational system spoofing by verifying whether the first position estimate 130 of the first vehicle 110 (e.g., the position estimate based on signals associated with navigational systems) is reliable. For example, the process 500 uses reliable data (e.g., the first relative position estimate 134) generated by radio ranging techniques (e.g., radar, lidar, etc.) to determine the relative position of the first vehicle 110 with respect to the second vehicle 120. The process 500 enables verification of the first position estimate 130 based on the second trust value 156 ($T_i^2$). In other implementations, the first position estimate 130 can be verified based on an $m^{th}$ trust value ($T^m$), where m is greater than one, such that $$T_i^m = 1 - \frac{\sum_{j \in N_i} T_j^{(m-1)} E_{ij}}{\sum_{j \in N_i} E_{ij}}.$$

Figure 6:
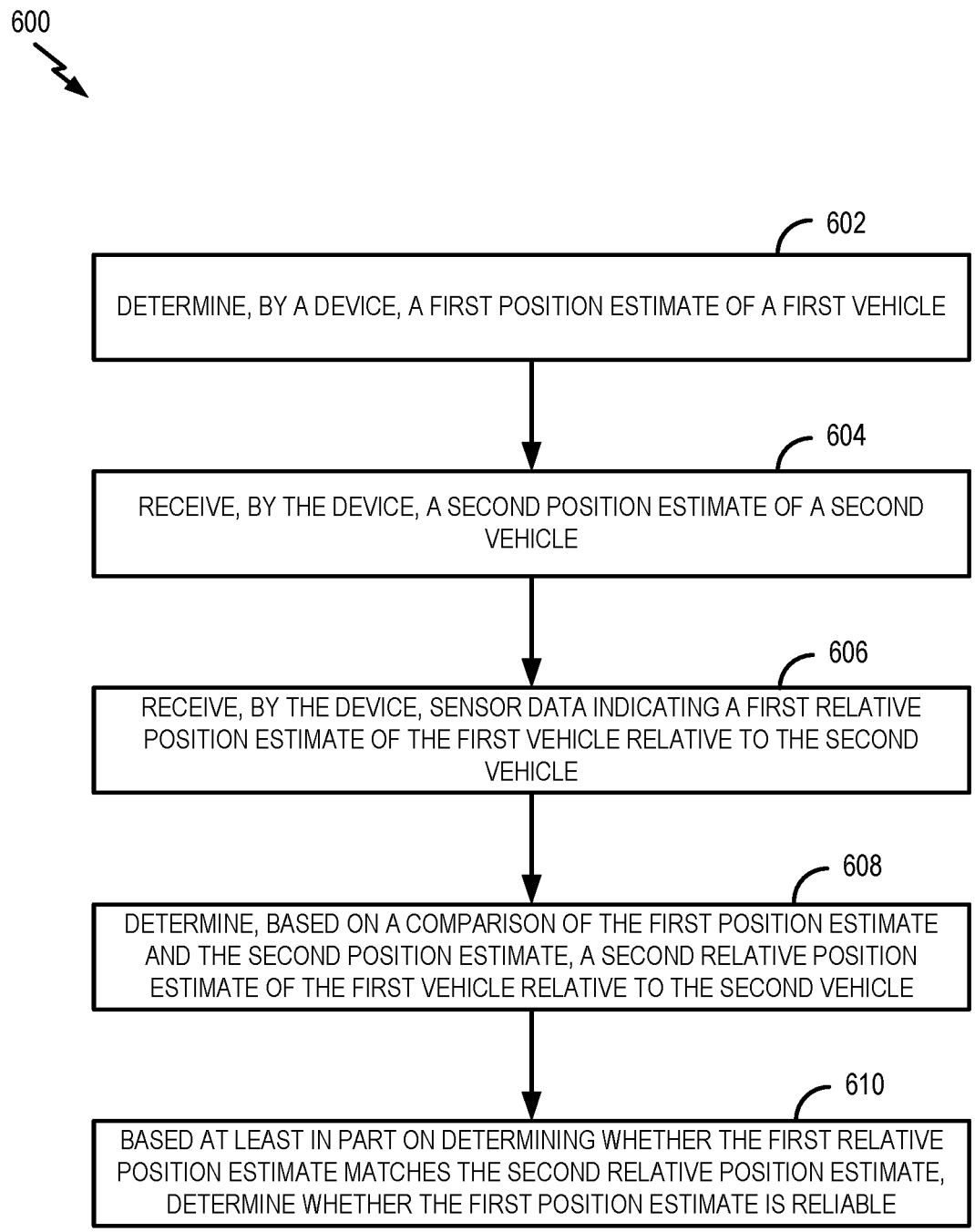
FIG. 6 is a flowchart of an example of a method of verifying a position of a vehicle.

Referring to FIG. 6, a method of verifying a position of a vehicle is shown and generally designated method 600. In a particular aspect, one or more operations of the method 600 are performed by the first vehicle 110, the device 102, the processor 114, the sensor 104, the receiver 106, the transmitter 108 of FIG. 1, or a combination thereof.

The method 600 includes determining, by a device, a first position estimate of a first vehicle, at block 602. For example, referring to FIG. 1, the first position estimate 130 of the first vehicle 110 can be determined by the processor 114 based on data or signals from one or more navigational systems. In a particular aspect, the first position estimate 130 is based on GPS data, dead reckoning data, GNSS data, LPS data, or a combination thereof. The processor 114 can use the data from the one or more navigational systems to perform a trilateration process to determine the first position estimate 130. The processor 114 can store the first position estimate 130 of the first vehicle 110 at the memory 116.

The method 600 includes receiving, by the device, a second position estimate of a second vehicle, at block 604. For example, referring to FIG. 1, the receiver 106 can receive the second position estimate 132 of the second vehicle 120. The second position estimate 132 can be determined independently from the device 102 and stored in the memory 116. As a non-limiting example, the second vehicle 120 can determine the second position estimate 132 in a substantially similar manner as the processor 114 determines the first position estimate 130 of the first vehicle 110. The second position estimate 132 can correspond to a position (e.g., longitude, latitude, and altitude) of the second vehicle 120, as determined by one or more navigational system signals obtained by the second vehicle 120.

The method 600 includes receiving, by the device, sensor data indicating a first relative position estimate of the first vehicle relative to the second vehicle, at block 606. For example, referring to FIG. 1, the processor 114 can receive the sensor data 105 indicating the first relative position estimate 134 of the first vehicle 110 relative to the second vehicle 120. The first relative position estimate 134 can indicate an estimated distance between the vehicles 110, 120 and an angular position of the second vehicle 120 with respect to the first vehicle 110. As described herein, the sensor data 105 can include lidar data, sonar data, radar data, time-of-flight data, or a combination thereof.

The method 600 includes, based on a comparison of the first position estimate and the second position estimate, a second relative position estimate of the first vehicle relative to the second vehicle, at block 608. For example, referring to FIG. 1, the processor 114 can determine the second relative position estimate 142 of the first vehicle 110 relative to the second vehicle 120 based on a comparison of the first position estimate 130 and the second position estimate 132. By comparing the first position estimate 130 to the second position estimate 132, the processor 114 can determine a distance between the vehicles 110, 120 and an angular position of the second vehicle 120 with respect to the first vehicle 110.

The method 600 includes, based at least in part on determining whether the first relative position estimate matches the second relative position estimate, determining whether the first position estimate is reliable, at block 610. For example, referring to FIG. 1, the processor 114 can determine whether the first position estimate 130 is reliable based at least in part on determining whether the first relative position estimate 134 matches the second relative position estimate 142. To illustrate, if the first relative position estimate 134 matches the second relative position estimate 142, the processor 114 can determine that the first position estimate 130 is reliable and that the signals associated with navigational systems and used to determine the first position estimate 130 were not subject to third party spoofing.

According to one implementation, the method 600 includes generating an output indicating that the first position estimate is unreliable based at least in part on determining that the first relative position estimate does not match the second relative position estimate. For example, referring to FIG. 1, the processor 114 can generate the output 144 indicating that the first position estimate 130 is unreliable based at least in part on the determination that the first relative position estimate 134 does not match the second relative position estimate 142.

According to one implementation, the method 600 includes receiving a plurality of second position estimates of a plurality of second vehicles. For example, referring to FIGS. 1-2, the first vehicle 110 can receive the plurality of second position estimates 132A-132C of the plurality of second vehicles 120A-120C. The sensor data 105 can indicate first relative position estimates 134A-134C of the first vehicle 110 relative to the plurality of second vehicles 120A-120C. The processor 114 can determine, based on a comparison of the first position estimate 130 and the plurality of second position estimates 132A-132C, the plurality of second relative position estimates 142A-142C of the first vehicle 110 relative to the plurality of second vehicles 120A-120C.

According to one implementation, the method 600 includes determining that the first position estimate is unreliable in response to determining that at least a threshold percentage of the plurality of first relative position estimates do not match corresponding ones of the plurality of second relative position estimates. For example, referring to FIG. 1, the processor 114 can determine that the first position estimate 130 is unreliable if a threshold percentage of the plurality of first relative position estimates 134A-134C do not match corresponding ones of the plurality of second relative position estimates 142A-142C. According to one implementation, the threshold percentage can be equal to 100 percent. According to another implementation, the threshold percentage can be equal to 50 percent.

According to one implementation, the method 600 includes determining a first trust value of the first vehicle based on a percentage of the plurality of first relative position estimates that do not match corresponding ones of the plurality of second relative position estimates. The method 600 can also include receiving, via a receiver, a plurality of first trust values of the plurality of second vehicles. The method 600 can also include determining whether the first position estimate is reliable based at least in part on the first trust value, the plurality of first trust values, or a combination thereof. For example, the method 600 can include determining that the first position estimate is reliable in response to determining that the first trust value indicates that all of the plurality of first relative position estimates match the corresponding ones of the plurality of second relative position estimates. As another example, the method 600 can include determining that the first position estimate is unreliable in response to determining that the first trust value indicates that none of the plurality of first relative position estimates match the corresponding ones of the plurality of second relative position estimates.

According to one implementation, the method 600 includes determining a second trust value of the first vehicle based on the plurality of first trust values, the plurality of first relative position estimates, and the plurality of second relative position estimates. The method 600 can also include determining whether the first position estimate is reliable based at least in part on the second trust value.

According to one implementation, the method 600 includes receiving, via a receiver, a plurality of second trust values of the plurality of second vehicles. The method 600 can also include determining a third trust value of the first vehicle based on the plurality of second trust values, the plurality of first relative position estimates, and the plurality of second relative position estimates. The method 600 can also include determining whether the first position estimate is reliable based at least in part on the third trust value.

The method 600 of FIG. 6 enables navigational system spoofing detection by verifying whether the first position estimate 130 of the first vehicle 110 (e.g., the position estimate based on signals associated with navigational systems) is reliable. For example, the method 600 enables generation of reliable data (e.g., the first relative position estimate 134) by using sensor systems (e.g., radar, lidar, etc.) to determine the relative position of the first vehicle 110 with respect to the second vehicle 120. The reliable data is used to determine whether the signals from the navigational systems can be used to achieve a similar relative position. If the relative positions are similar, the device 102 can verify that the first position estimate 130 of the first vehicle 110 is reliable and that the signals associated with navigational systems have not been spoofed. However, if the relative positions are not similar, the device 102 can generate an alert indicating potential signal spoofing.

Figure 7:
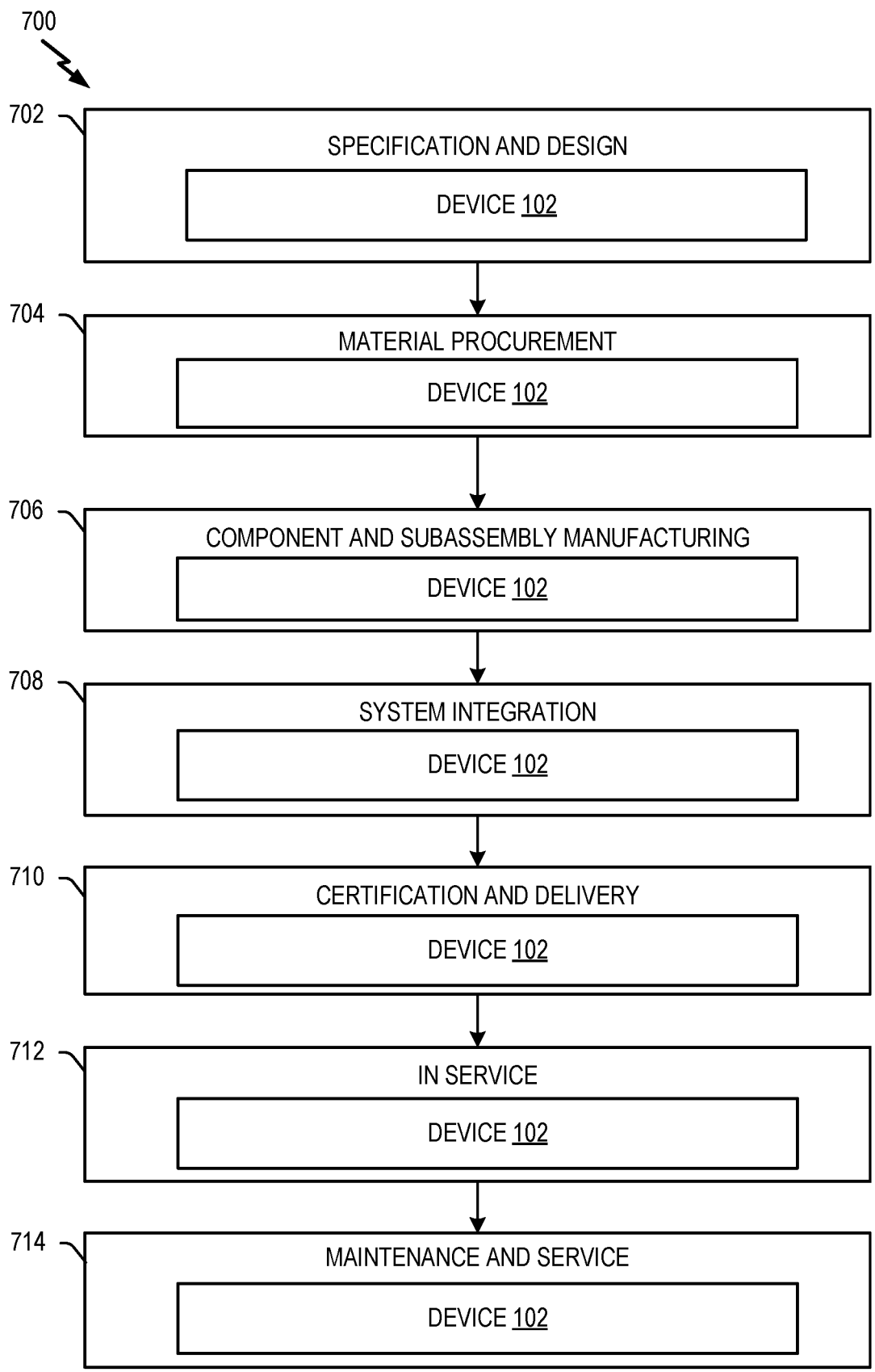
FIG. 7 is a flowchart illustrating a life cycle of a vehicle that includes the device of FIG. 1.

Referring to FIG. 7, a flowchart illustrative of a life cycle of the first vehicle 110 is shown and designated method 700. During pre-production, the method 700 includes, at block 702, specification and design of a vehicle (e.g., an aircraft), such as the first vehicle 110 of FIG. 1. During specification and design of the first vehicle 110, the method 700 can include specification and design of the device 102. At block 704, the method 700 includes material procurement, which can include procuring materials for the device 102.

During production, the method 700 includes, at block 706, component and subassembly manufacturing and, at block 708, system integration of the first vehicle 110. For example, the method 700 can include component and subassembly manufacturing of the device 102 and system integration of the device 102. At block 710, the method 700 includes certification and delivery of the first vehicle 110 and, at block 712, placing the first vehicle 110 in service. Certification and delivery can include certification of the device 102 to place the device 102 in service. In some implementations, the device 102 is used to test the first vehicle 110 during the certification process and subsequently removed, e.g., prior to placing the first vehicle 110 in service. While in service by a customer, the first vehicle 110 can be scheduled for routine maintenance and service (which can also include modification, reconfiguration, refurbishment, and so on). At block 714, the method 700 includes performing maintenance and service on the first vehicle 110, which can include performing maintenance and service on the device 102. In a particular aspect, maintenance and service requirements could be determined based on the number of reports of initial and/or deterrent buffet, and the total amount of time recorded in either of the buffet states.

Each of the processes of the method 700 can be performed or carried out by a system integrator, a third party, and/or an operator (e.g., a customer). For the purposes of this description, a system integrator can include without limitation any number of aircraft manufacturers and major-system subcontractors; a third party can include without limitation any number of venders, subcontractors, and suppliers; and an operator can be an airline, leasing company, military entity, service organization, and so on.

Aspects of the disclosure can be described in the context of an example of a vehicle. A particular example of a vehicle is the aircraft 800 as shown in FIG. 8.

Figure 8:
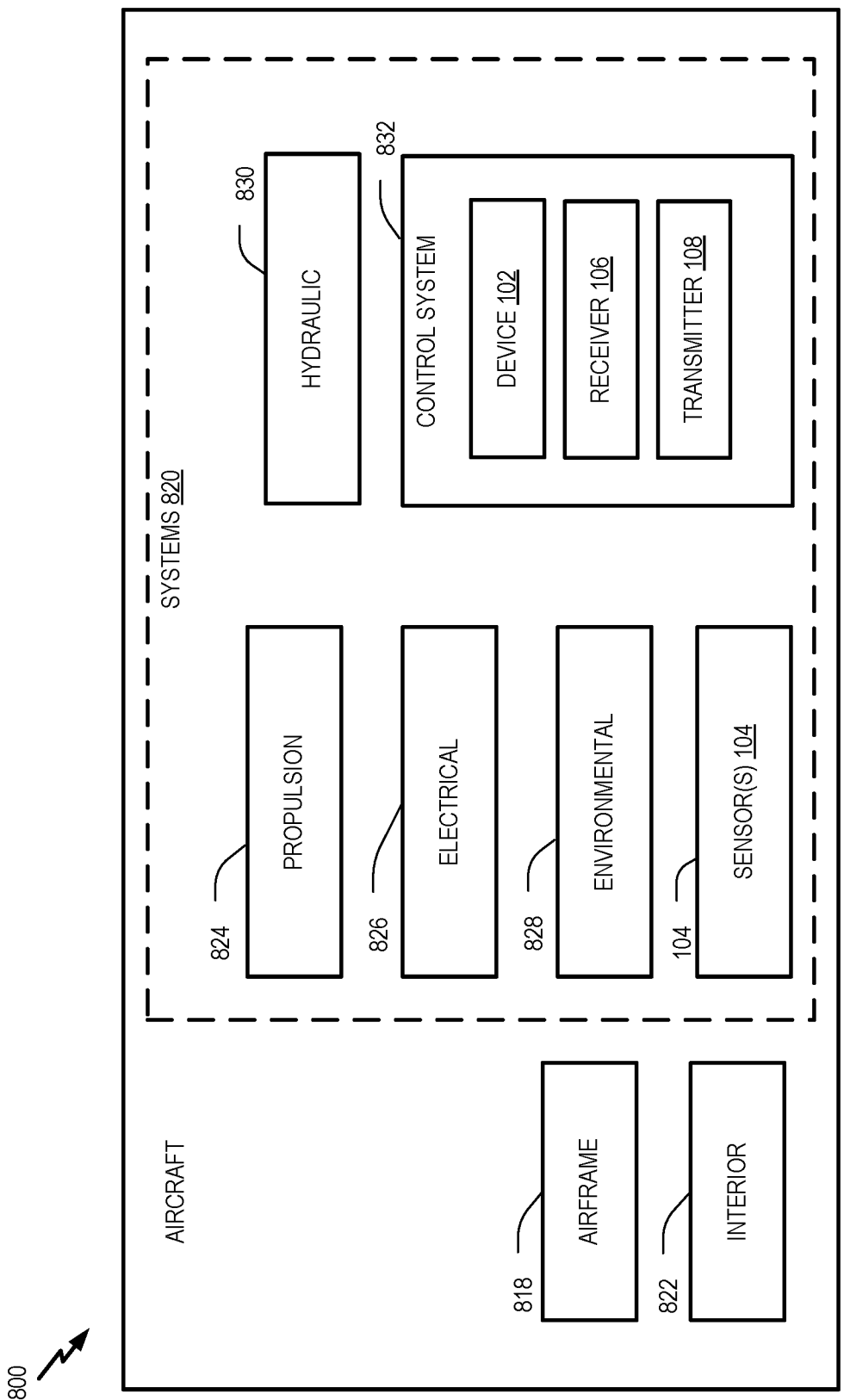
FIG. 8 is a block diagram of an aircraft that is configured to perform position verification.

In the example of FIG. 8, the aircraft 800 can correspond to the first vehicle 110 of FIG. 1. The aircraft 800 includes an airframe 818 with a plurality of systems 820 and an interior 822. Examples of the plurality of systems 820 include one or more of a propulsion system 824, an electrical system 826, an environmental system 828, a hydraulic system 830, and a control system 832. The control system 832 can include the device 102, the receiver 106, and the transmitter 108 of FIG. 1. Any number of other systems can be included. For example, the systems 820 can include the sensor 104.

Figure 9:
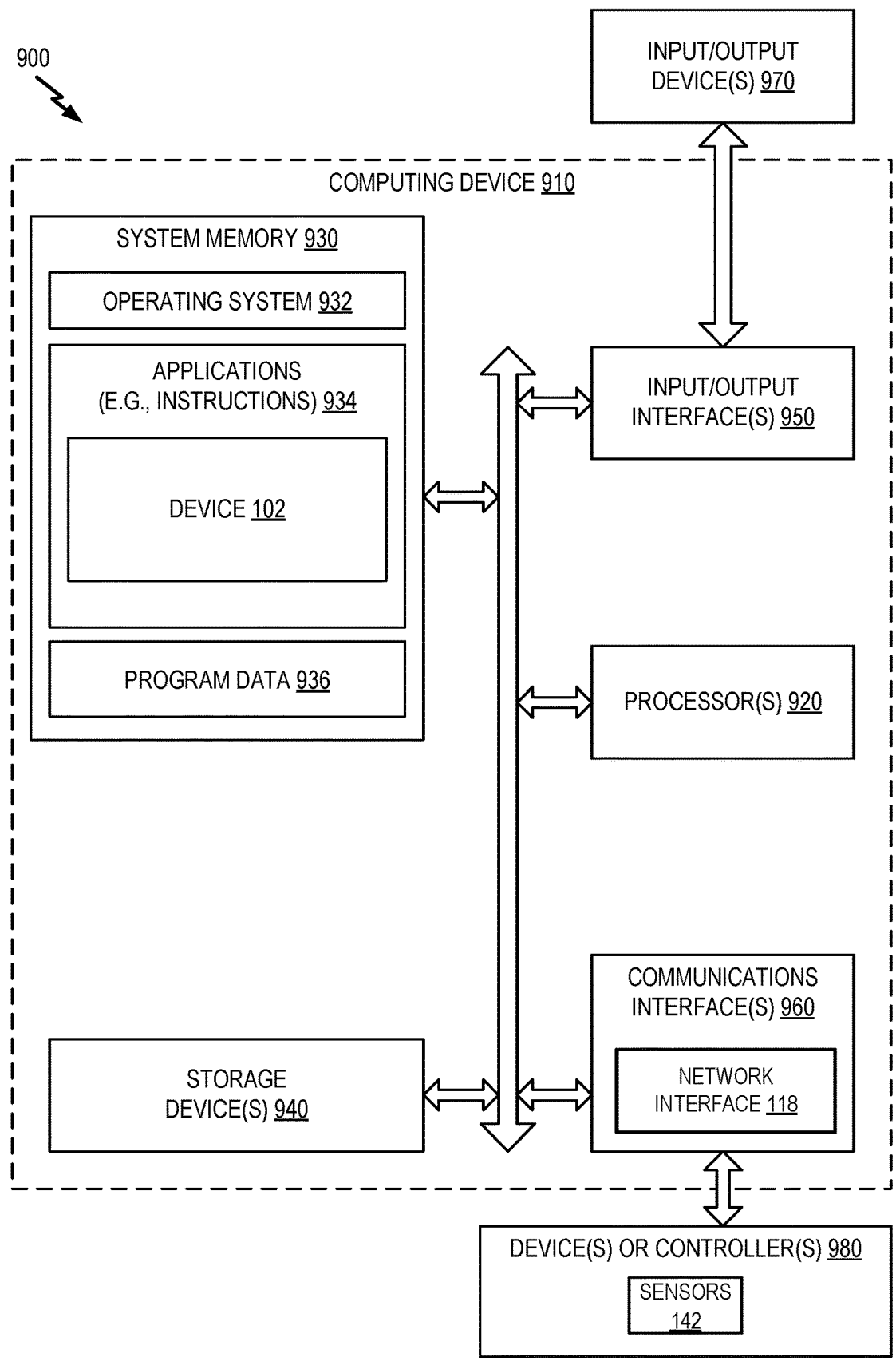
FIG. 9 is a block diagram of a computing environment including a computing device configured to support aspects of computer-implemented methods and computer-executable program instructions (or code) according to the subject disclosure.

FIG. 9 is a block diagram of a computing environment 900 including a computing device 910 configured to support aspects of computer-implemented methods and computer-executable program instructions (or code) according to the subject disclosure. For example, the computing device 910, or portions thereof, is configured to execute instructions to initiate, perform, or control one or more operations described with reference to FIGS. 1-8.

The computing device 910 includes one or more processors 920. The processor(s) 920 are configured to communicate with system memory 930, one or more storage devices 940, one or more input/output interfaces 950, one or more communications interfaces 960, or any combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which can include a basic input/output system for booting the computing device 910 as well as a full operating system to enable the computing device 910 to interact with users, other programs, and other devices. The system memory 930 stores system (program) data 936, such as the sensor data 105, the first position estimate 130, the second position estimate 132, the first relative position estimate 134, the second relative position estimate 142, the first trust value 152, the second trust value 156, and the third trust value 160.

The system memory 930 includes one or more applications 934 (e.g., sets of instructions) executable by the processor(s) 920. As an example, the one or more applications 934 include instructions executable by the processor(s) 920 to initiate, control, or perform one or more operations described with reference to FIGS. 1-8. To illustrate, the one or more applications 934 include instructions executable by the processor(s) 920 to initiate, control, or perform one or more operations described with reference to the device 102.

In a particular implementation, the system memory 930 includes a non-transitory, computer readable medium (e.g., a computer-readable storage device) storing the instructions that, when executed by the processor(s) 920, cause the processor(s) 920 to initiate, perform, or control operations to verify a vehicle position. The operations include determining a first position estimate (e.g., the first position estimate 130) of a first vehicle (e.g., the first vehicle 110). The operations also include receiving a second position estimate (e.g., the second position estimate 132) of a second vehicle (e.g., the second vehicle 120) and receive sensor data (e.g., the sensor data 105) indicating a first relative position estimate (e.g., the first relative position estimate 134) of the first vehicle relative to the second vehicle. The operations further include determining, based on a comparison of the first position estimate and the second position estimate, a second relative position estimate (e.g., the second relative position estimate 142) of the first vehicle relative to the second vehicle. The operations also include, based at least in part on determining whether the first relative position estimate matches the second relative position estimate, determining whether the first position estimate is reliable.

The one or more storage devices 940 include nonvolatile storage devices, such as magnetic disks, optical disks, or flash memory devices. In a particular example, the storage devices 940 include both removable and non-removable memory devices. The storage devices 940 are configured to store an operating system, images of operating systems, applications (e.g., one or more of the applications 934), and program data (e.g., the program data 936). In a particular aspect, the system memory 930, the storage devices 940, or both, include tangible computer-readable media. In a particular aspect, one or more of the storage devices 940 are external to the computing device 910.

The one or more input/output interfaces 950 enable the computing device 910 to communicate with one or more input/output devices 970 to facilitate user interaction. For example, the one or more input/output interfaces 950 can include a display interface, an input interface, or both. For example, the input/output interface 950 is adapted to receive input from a user, to receive input from another computing device, or a combination thereof. In some implementations, the input/output interface 950 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, N.J.). In some implementations, the input/output device 970 includes one or more user interface devices and displays, including some combination of the sensor 104, the display device 112, buttons, keyboards, pointing devices, displays, speakers, microphones, touch screens, and other devices.

The processor(s) 920 are configured to communicate with devices or controllers 980 via the one or more communications interfaces 960. For example, the one or more communications interfaces 960 can include the network interface 118. The devices or controllers 980 can include, for example, the sensor 104, the network interface 118, one or more other devices, or any combination thereof.

In some implementations, a non-transitory, computer readable medium stores instructions that, when executed by one or more processors 920, cause the one or more processors 920 to initiate, perform, or control operations to perform part or all of the functionality described above. For example, the instructions can be executable to implement one or more of the operations or methods of FIGS. 1-8. In some implementations, part or all of one or more of the operations or methods of FIGS. 1-8 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Further, the disclosure comprises embodiments according to the following clauses:

Clause 1 includes a device comprising: a memory configured to store a first position estimate of a first vehicle; a receiver configured to receive a second position estimate of a second vehicle; a sensor configured to generate sensor data indicating a first relative position estimate of the first vehicle relative to the second vehicle; and one or more processors configured to: determine, based on a comparison of the first position estimate and the second position estimate, a second relative position estimate of the first vehicle relative to the second vehicle; and based at least in part on determining whether the first relative position estimate matches the second relative position estimate, determine whether the first position estimate is reliable.

Clause 2 includes the device of clause 1, wherein the one or more processors are configured to, based at least in part on determining that the first relative position estimate does not match the second relative position estimate, generate an output indicating that the first position estimate is unreliable.

Clause 3 includes the device of any of clauses 1 to 2, wherein the first position estimate is based on global positioning system (GPS) data, dead reckoning data, global navigation satellite system (GNSS) data, a local positioning system (LPS) data, or a combination thereof.

Clause 4 includes the device of any of clauses 1 to 3, wherein the sensor data comprises lidar data, sonar data, radar data, time-of-flight data, or a combination thereof.

Clause 5 includes the device of any of clauses 1 to 4, wherein the receiver is configured to receive a plurality of second position estimates of a plurality of second vehicles, wherein the plurality of second vehicles comprises the second vehicle, wherein the sensor data indicates first relative position estimates of the first vehicle relative to the plurality of second vehicles, and wherein the one or more processors are configured to determine, based on a comparison of the first position estimate and the plurality of second position estimates, a plurality of second relative position estimates of the first vehicle relative to the plurality of second vehicles.

Clause 6 includes the device of clause 5, wherein the one or more processors are configured to, in response to determining that at least a threshold percentage of the plurality of first relative position estimates do not match corresponding ones of the plurality of second relative position estimates, determine that the first position estimate is unreliable.

Clause 7 includes the device of clause 6, wherein the threshold percentage is equal to 100 percent.

Clause 8 includes the device of clause 6, wherein the threshold percentage is greater than or equal to 50 percent.

Clause 9 includes the device of any of clauses 1 to 8, wherein the one or more processors are configured to: determine a first trust value of the first vehicle based on a percentage of the plurality of first relative position estimates that do not match corresponding ones of the plurality of second relative position estimates; receive, via the receiver, a plurality of first trust values of the plurality of second vehicles; and based at least in part on the first trust value, the plurality of first trust values, or a combination thereof, determine whether the first position estimate is reliable.

Clause 10 includes the device of clause 9, wherein the one or more processors are configured to, in response to determining that the first trust value indicates that all of the plurality of first relative position estimates match the corresponding ones of the plurality of second relative position estimates, determine that the first position estimate is reliable.

Clause 11 includes the device of clause 9, wherein the one or more processors are configured to, in response to determining that the first trust value indicates that none of the plurality of first relative position estimates match the corresponding ones of the plurality of second relative position estimates, determine that the first position estimate is unreliable.

Clause 12 includes the device of clause 9, further comprising a transmitter configured to transmit the first trust value of the first vehicle to one or more of the plurality of second vehicles.

Clause 13 includes the device of clause 9, wherein the one or more processors are configured to: determine a second trust value of the first vehicle based on the plurality of first trust values, the plurality of first relative position estimates, and the plurality of second relative position estimates; and based at least in part on the second trust value, determine whether the first position estimate is reliable.

Clause 14 includes the device of clause 13, wherein the one or more processors are configured to: receive, via the receiver, a plurality of second trust values of the plurality of second vehicles; determine a third trust value of the first vehicle based on the plurality of second trust values, the plurality of first relative position estimates, and the plurality of second relative position estimates; and based at least in part on the third trust value, determine whether the first position estimate is reliable.

Clause 15 includes a method comprising: determining, by a device, a first position estimate of a first vehicle; receiving, by the device, a second position estimate of a second vehicle; receiving, by the device, sensor data indicating a first relative position estimate of the first vehicle relative to the second vehicle; determining, based on a comparison of the first position estimate and the second position estimate, a second relative position estimate of the first vehicle relative to the second vehicle; and based at least in part on determining whether the first relative position estimate matches the second relative position estimate, determining whether the first position estimate is reliable.

Clause 16 includes the method of clause 15, further comprising generating an output indicating that the first position estimate is unreliable based at least in part on determining that the first relative position estimate does not match the second relative position estimate.

Clause 17 includes the method of any of clauses 15 to 16, wherein the first position estimate is based on global positioning system (GPS) data, dead reckoning data, global navigation satellite system (GNSS) data, a local positioning system (LPS) data, or a combination thereof.

Clause 18 includes the method of any of clauses 15 to 17, wherein the sensor data comprises lidar data, sonar data, radar data, time-of-flight data, or a combination thereof.

Clause 19 includes the method of any of clause 15 to 18, further comprising: receiving a plurality of second position estimates of a plurality of second vehicles, wherein the plurality of second vehicles comprises the second vehicle, wherein the sensor data indicates first relative position estimates of the first vehicle relative to the plurality of second vehicles; and determining, based on a comparison of the first position estimate and the plurality of second position estimates, a plurality of second relative position estimates of the first vehicle relative to the plurality of second vehicles.

Clause 20 includes the method of clause 19, further comprising determining that the first position estimate is unreliable in response to determining that at least a threshold percentage of the plurality of first relative position estimates do not match corresponding ones of the plurality of second relative position estimates.

Clause 21 includes a non-transitory computer-readable medium storing instructions that, when executed by one or more processors, cause the one or more processors to: determine a first position estimate of a first vehicle; receive a second position estimate of a second vehicle; receive sensor data indicating a first relative position estimate of the first vehicle relative to the second vehicle; determine, based on a comparison of the first position estimate and the second position estimate, a second relative position estimate of the first vehicle relative to the second vehicle; and based at least in part on determining whether the first relative position estimate matches the second relative position estimate, determine whether the first position estimate is reliable.

Clause 22 includes the non-transitory computer-readable medium of clause 21, wherein the instructions, when executed by the one or more processors, further cause the one or more processors to generate an output indicating that the first position estimate is unreliable based at least in part on determining that the first relative position estimate does not match the second relative position estimate.

Clause 23 includes the non-transitory computer-readable medium of any one of clauses 21 to 22, wherein the first position estimate is based on global positioning system (GPS) data, dead reckoning data, global navigation satellite system (GNSS) data, a local positioning system (LPS) data, or a combination thereof.

What is claimed is:

1. A device comprising:
a memory configured to store a first position estimate of a first vehicle;
a receiver configured to receive a second position estimate of a second vehicle, wherein the receiver is configured to receive a plurality of second position estimates of a plurality of second vehicles, wherein the plurality of second vehicles comprises the second vehicle;
a sensor configured to generate sensor data indicating a first relative position estimate of the first vehicle relative to the second vehicle, wherein the sensor data indicates a plurality of first relative position estimates of the first vehicle relative to the plurality of second vehicles; and
one or more processors configured to:
determine, based on a comparison of the first position estimate and the plurality of second position estimates, a plurality of second relative position estimates of the first vehicle relative to the plurality of second vehicles, the plurality of second relative position estimates including a second relative position estimate of the first vehicle relative to the second vehicle; and
based at least in part on determining whether the first relative position estimate matches the second relative position estimate:
compare a first subset of the plurality of first relative position estimates to a second subset of the plurality of second relative position estimates to determine a percentage of the plurality of first relative position estimates that match corresponding ones of the plurality of second relative position estimates, wherein each first relative position estimate of the first subset is compared to one or more corresponding second relative position estimates of the second subset, wherein a particular first relative position estimate of the plurality of first relative position estimates identifies a particular first relative position, wherein a particular second relative position estimate of the plurality of second relative position estimates identifies a particular second relative position, the particular first relative position estimate corresponding to the particular second relative position estimate, and wherein the particular first relative position estimate matches the particular second relative position estimate responsive to the particular first relative position identifying a position within a threshold distance of the particular second relative position;
determine whether the first position estimate is reliable, wherein the first position estimate is determined to be unreliable responsive to determining that the percentage indicates that at least a threshold percentage of the plurality of first relative position estimates do not match corresponding ones of the plurality of second relative position estimates; and
perform a control action to control movement of the first vehicle, wherein the control action is determined based in part on whether the first position estimate is reliable.

2. The device of claim 1, wherein the one or more processors are configured to, based at least in part on determining that the first relative position estimate does not match the second relative position estimate, generate an output indicating that the first position estimate is unreliable.

3. The device of claim 1, wherein the first position estimate is based on global positioning system (GPS) data, dead reckoning data, global navigation satellite system (GNSS) data, a local positioning system (LPS) data, or a combination thereof.

4. The device of claim 1, wherein the sensor data comprises lidar data, sonar data, radar data, time-of-flight data, or a combination thereof.

5. The device of claim 1, wherein the first position estimate identifies a first longitude, a first latitude, and a first altitude associated with the first vehicle, and wherein each second position estimate of the plurality of second position estimates identifies a particular second longitude, a particular second latitude, and a particular second altitude corresponding to a particular second vehicle.

6. The device of claim 5, wherein each of the plurality of second relative position estimates identifies a particular distance and a particular angular position corresponding to the first vehicle and the particular second vehicle.

7. The device of claim 1, wherein the threshold percentage is equal to 100 percent.

8. The device of claim 1, wherein the threshold percentage is greater than or equal to 50 percent.

9. The device of claim 1, wherein the one or more processors are configured to:
determine a first trust value of the first vehicle based on a percentage of the plurality of first relative position estimates that do not match corresponding ones of the plurality of second relative position estimates; and
receive, via the receiver, a plurality of first trust values of the plurality of second vehicles, wherein whether the first position estimate is determined to be reliable is based at least in part on the first trust value, the plurality of first trust values, or a combination thereof.

10. The device of claim 9, wherein the one or more processors are configured to, in response to determining that the first trust value indicates that all of the plurality of first relative position estimates match the corresponding ones of the plurality of second relative position estimates, determine that the first position estimate is reliable.

11. The device of claim 9, wherein the one or more processors are configured to, in response to determining that the first trust value indicates that none of the plurality of first relative position estimates match the corresponding ones of the plurality of second relative position estimates, determine that the first position estimate is unreliable.

12. The device of claim 9, further comprising a transmitter configured to transmit the first trust value of the first vehicle to one or more of the plurality of second vehicles.

13. The device of claim 9, wherein the one or more processors are configured to determine a second trust value of the first vehicle based on the plurality of first trust values, the plurality of first relative position estimates, and the plurality of second relative position estimates, wherein whether the first position estimate is determined to be reliable is based at least in part on the second trust value.

14. The device of claim 13, wherein the one or more processors are configured to:
  receive, via the receiver, a plurality of second trust values of the plurality of second vehicles; and
  determine a third trust value of the first vehicle based on the plurality of second trust values, the plurality of first relative position estimates, and the plurality of second relative position estimates, wherein whether the first position estimate is determined to be reliable is based at least in part on the third trust value.

15. A method comprising:
  determining, by a device, a first position estimate of a first vehicle;
  receiving, by the device, a plurality of second position estimates of a plurality of second vehicles including a second position estimate of a second vehicle, wherein the plurality of second vehicles comprises the second vehicle;
  receiving, by the device, sensor data indicating a plurality of first relative position estimates of the first vehicle relative to the plurality of second vehicles including a first relative position estimate of the first vehicle relative to the second vehicle;
  determining, based on a comparison of the first position estimate and the plurality of second position estimates, a plurality of second relative position estimates of the first vehicle relative to the plurality of second vehicles, the plurality of second relative position estimates including a second relative position estimate of the first vehicle relative to the second vehicle;
  based at least in part on determining whether the first relative position estimate matches the second relative position estimate:
    comparing a first subset of the plurality of first relative position estimates to a second subset of the plurality of second relative position estimates to determine a percentage of the plurality of first relative position estimates that match corresponding ones of the plurality of second relative position estimates, wherein each first relative position estimate of the first subset is compared to one or more corresponding second relative position estimates of the second subset, wherein a particular first relative position estimate of the plurality of first relative position estimates identifies a particular first relative position, wherein a particular second relative position estimate of the plurality of second relative position estimates identifies a particular second relative position, the particular first relative position estimate corresponding to the particular second relative position estimate, and wherein the particular first relative position estimate matches the particular second relative position estimate responsive to the particular first relative position identifying a position within a threshold distance of the particular second relative position;
    determining whether the first position estimate is reliable, wherein the first position estimate is determined to be unreliable responsive to determining that the percentage indicates that at least a threshold percentage of the plurality of first relative position estimates do not match corresponding ones of the plurality of second relative position estimates; and
  performing a control action to control movement of the first vehicle, wherein the control action is determined based in part on whether the first position estimate is reliable.

16. The method of claim 15, further comprising generating an output indicating that the first position estimate is unreliable based at least in part on determining that the first relative position estimate does not match the second relative position estimate.

17. The method of claim 15, wherein the first position estimate is based on global positioning system (GPS) data, dead reckoning data, global navigation satellite system (GNSS) data, a local positioning system (LPS) data, or a combination thereof.

18. The method of claim 15, wherein the sensor data comprises lidar data, sonar data, radar data, time-of-flight data, or a combination thereof.

19. A non-transitory computer-readable medium storing instructions that, when executed by one or more processors, cause the one or more processors to:
  determine a first position estimate of a first vehicle;
  receive a plurality of second position estimates of a plurality of second vehicles including a second position estimate of a second vehicle, wherein the plurality of second vehicles comprises the second vehicle;
  receive sensor data indicating a plurality of first relative position estimates of the first vehicle relative to the plurality of second vehicles including a first relative position estimate of the first vehicle relative to the second vehicle;
  determine, based on a comparison of the first position estimate and the plurality of second position estimates, a plurality of second relative position estimates of the first vehicle relative to the plurality of second vehicles, the plurality of second relative position estimates including a second relative position estimate of the first vehicle relative to the second vehicle;
  based at least in part on determining whether the first relative position estimate matches the second relative position estimate,
    compare a first subset of the plurality of first relative position estimates to a second subset of the plurality of second relative position estimates to determine a percentage of the plurality of first relative position estimates that match corresponding ones of the plurality of second relative position estimates, wherein each first relative position estimate of the first subset is compared to one or more corresponding second relative position estimates of the second subset, wherein a particular first relative position estimate of the plurality of first relative position estimates identifies a particular first relative position, wherein a particular second relative position estimate of the plurality of second relative position estimates identifies a particular second relative position, the particular first relative position estimate corresponding to the particular second relative position estimate, and wherein the particular first relative position estimate matches the particular second relative position estimate responsive to the particular first relative position identifying a position within a threshold distance of the particular second relative position;

determine whether the first position estimate is reliable, wherein the first position estimate is determined to be unreliable responsive to determining that the percentage indicates that at least a threshold percentage of the plurality of first relative position estimates do not match corresponding ones of the plurality of second relative position estimates; and perform a control action to control movement of the first vehicle, wherein the control action is determined based in part on whether the first position estimate is reliable.

20. The non-transitory computer-readable medium of claim 19, wherein the instructions, when executed by the one or more processors, further cause the one or more processors to generate an output indicating that the first position estimate is unreliable based at least in part on determining that the first relative position estimate does not match the second relative position estimate.

* * * * *